Jan. 28, 1941.   H. T. AVERY   2,229,630
CALCULATING MACHINE
Filed Jan. 23, 1933    22 Sheets-Sheet 3
FIG_29_
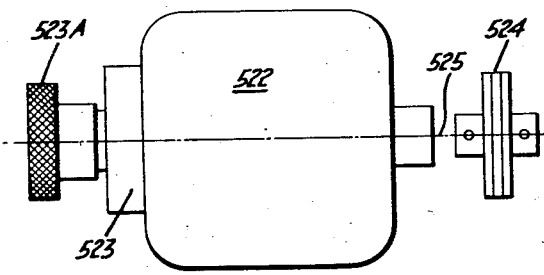
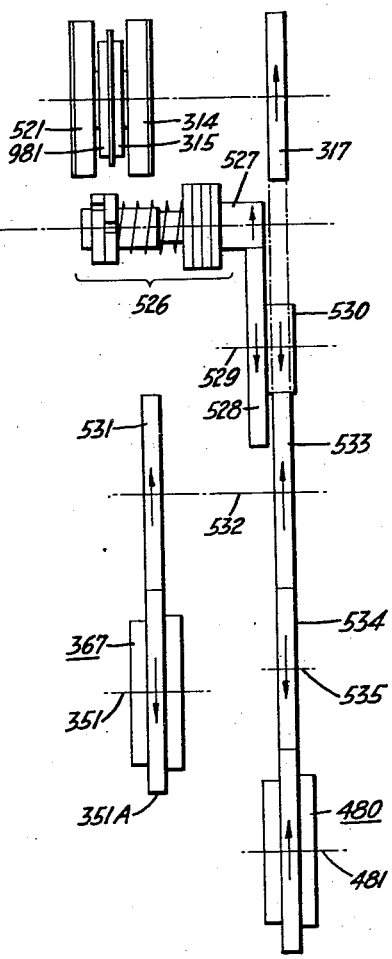
FIG_2F_
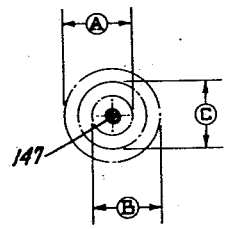
FIG.2B.
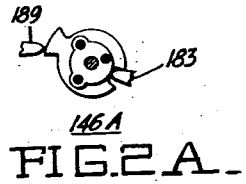
FIG.2A_
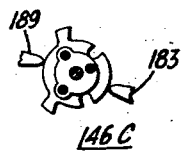
FIG.2C.
FIG.2D_
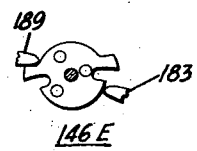
FIG.2E.
INVENTOR.
Harold T. Avery
BY
ATTORNEY.

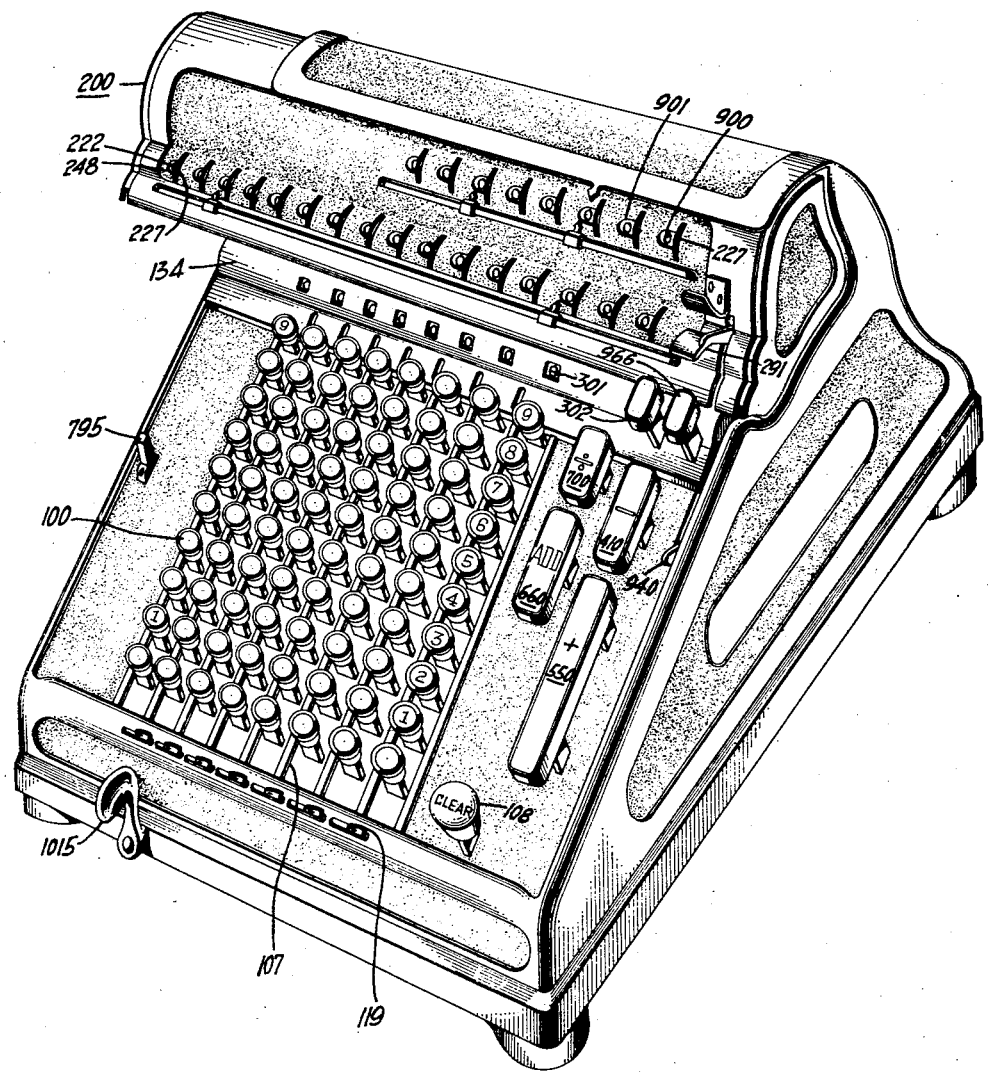

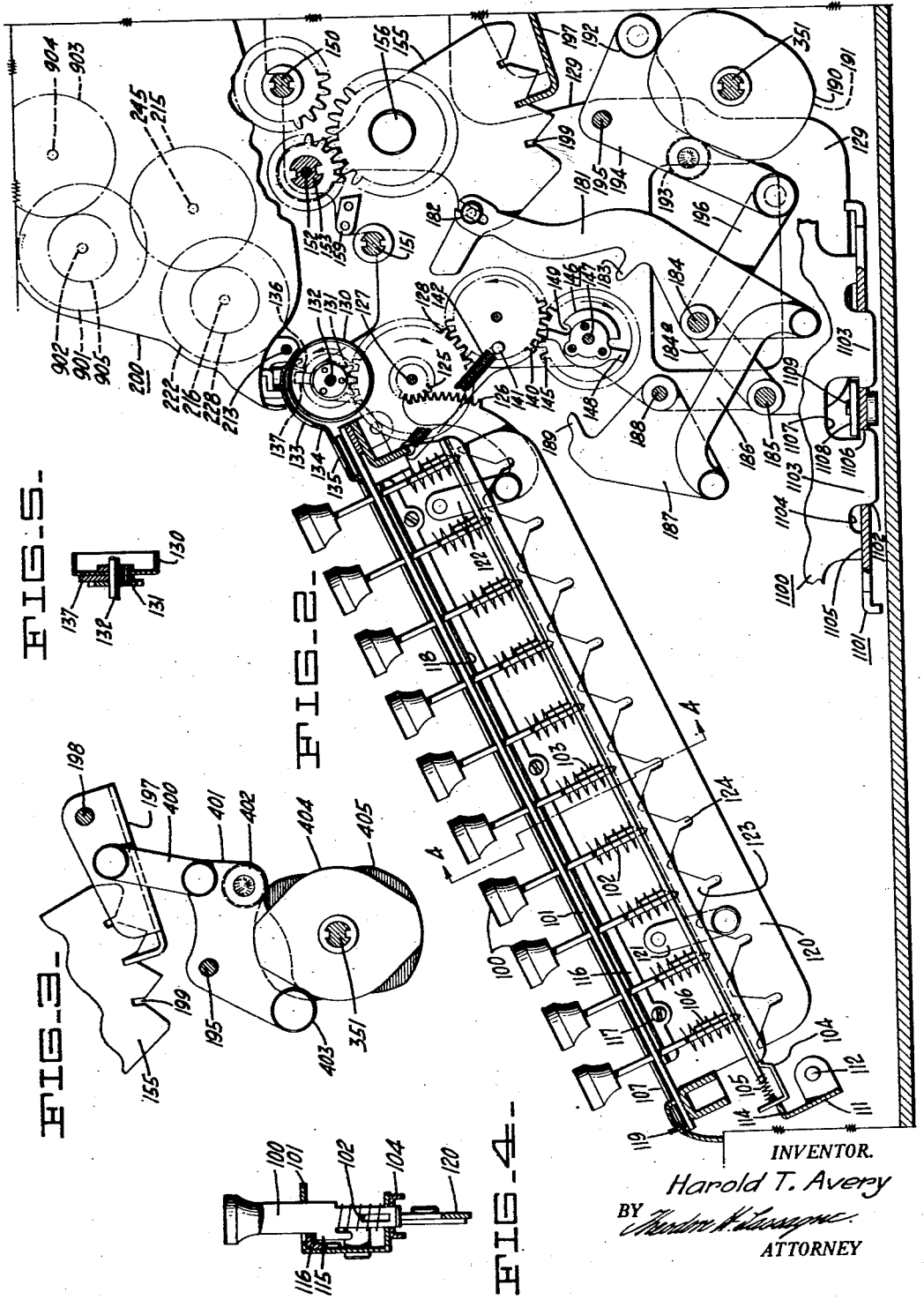

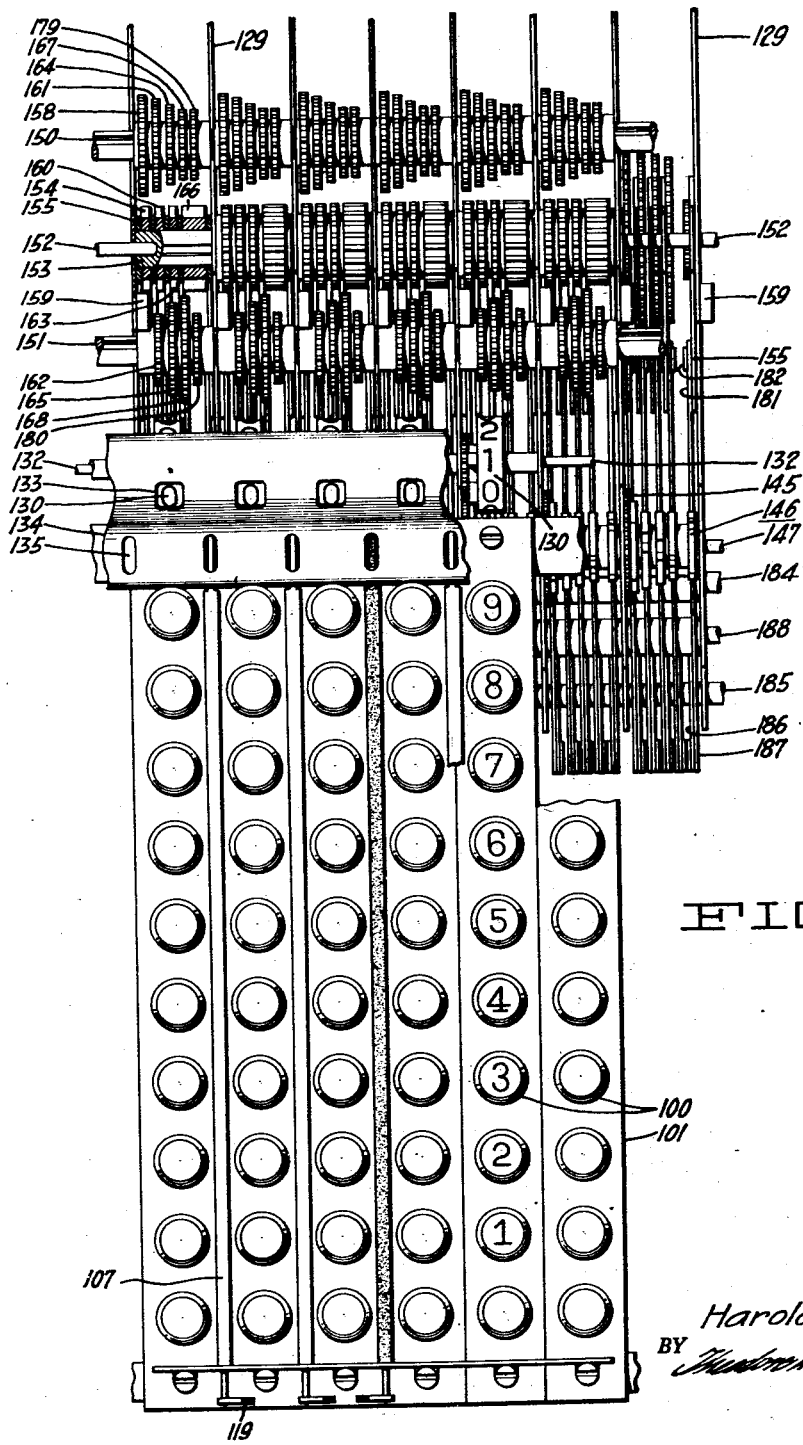
FIG_6_

Jan. 28, 1941.                H. T. AVERY                2,229,630
                          CALCULATING MACHINE
                       Filed Jan. 23, 1933      22 Sheets—Sheet 5
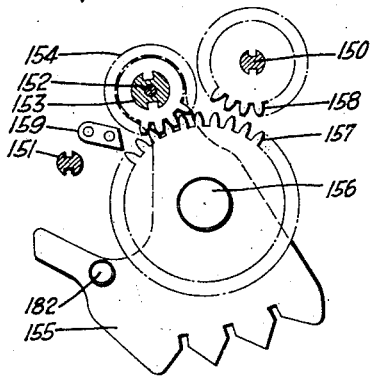
FIG_7A
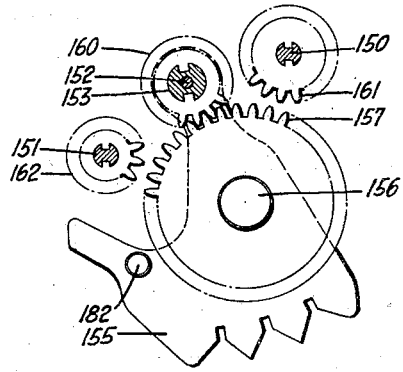
FIG_7B
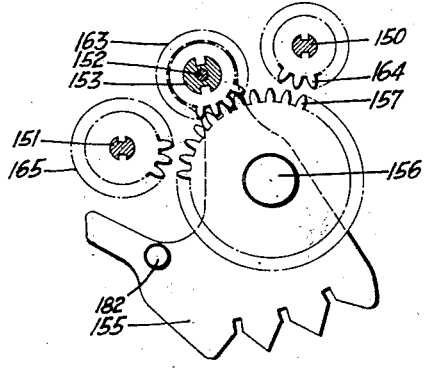
FIG_7C
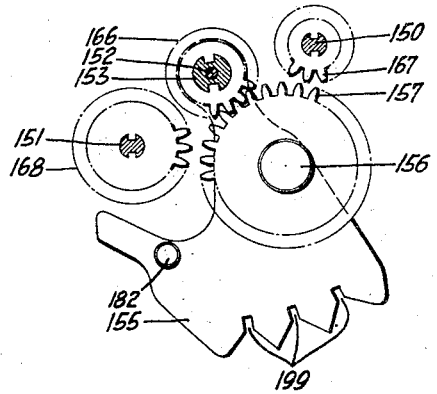
FIG_7D
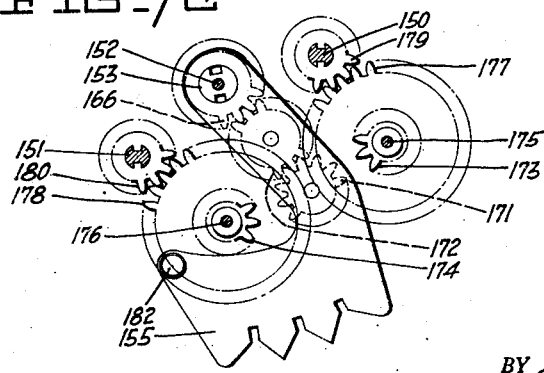
FIG_7E
INVENTOR.
Harold T. Avery
BY
ATTORNEY.

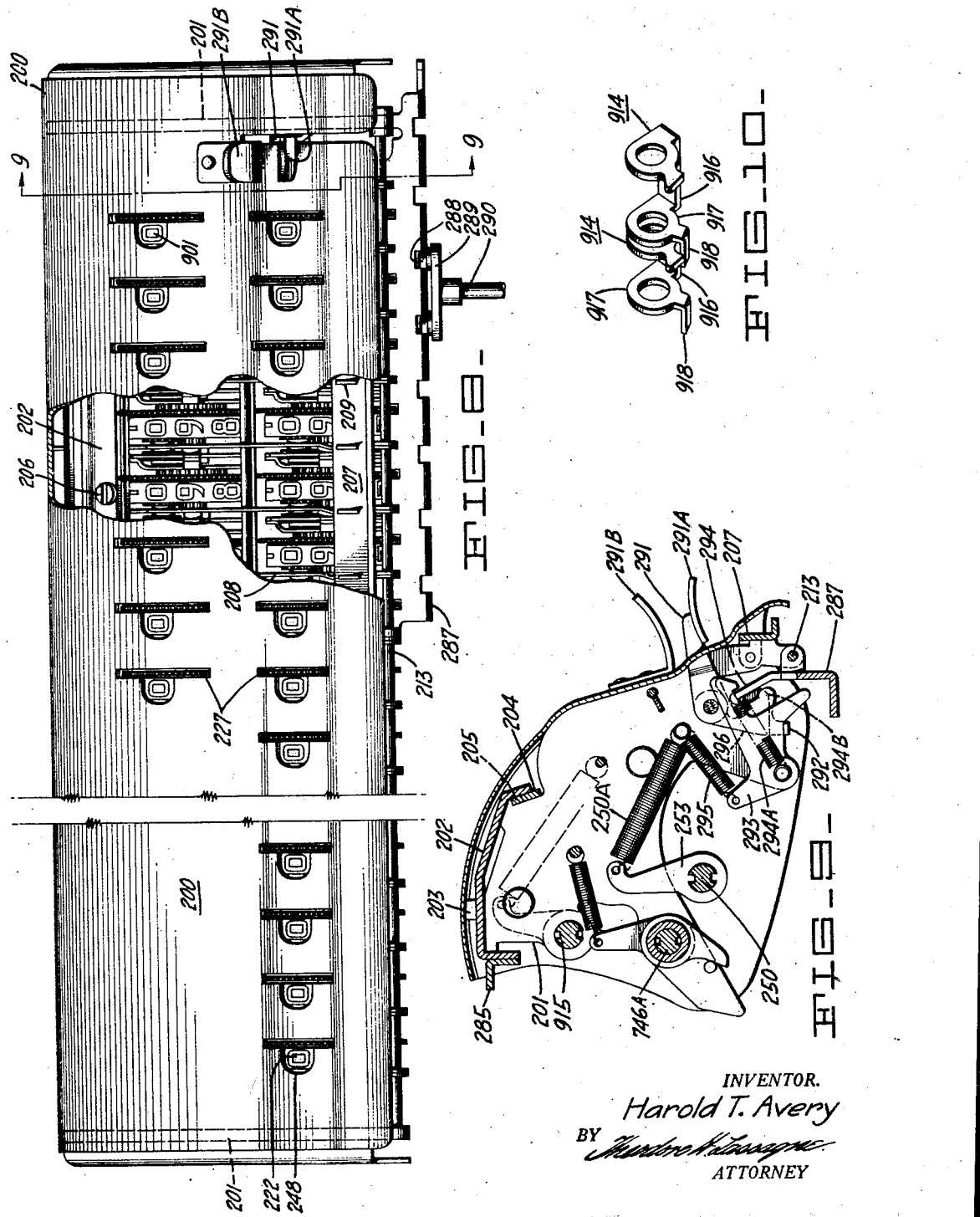

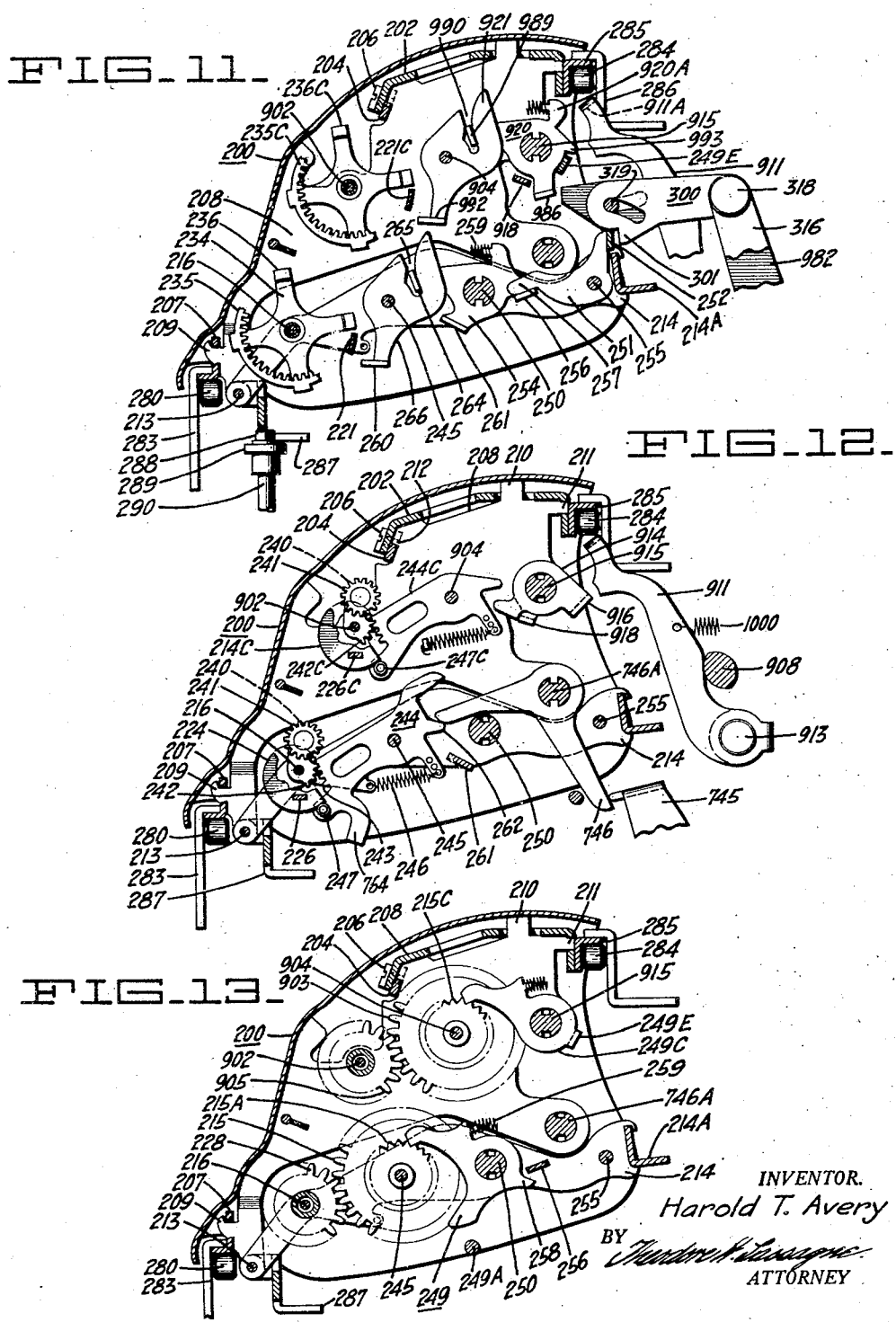

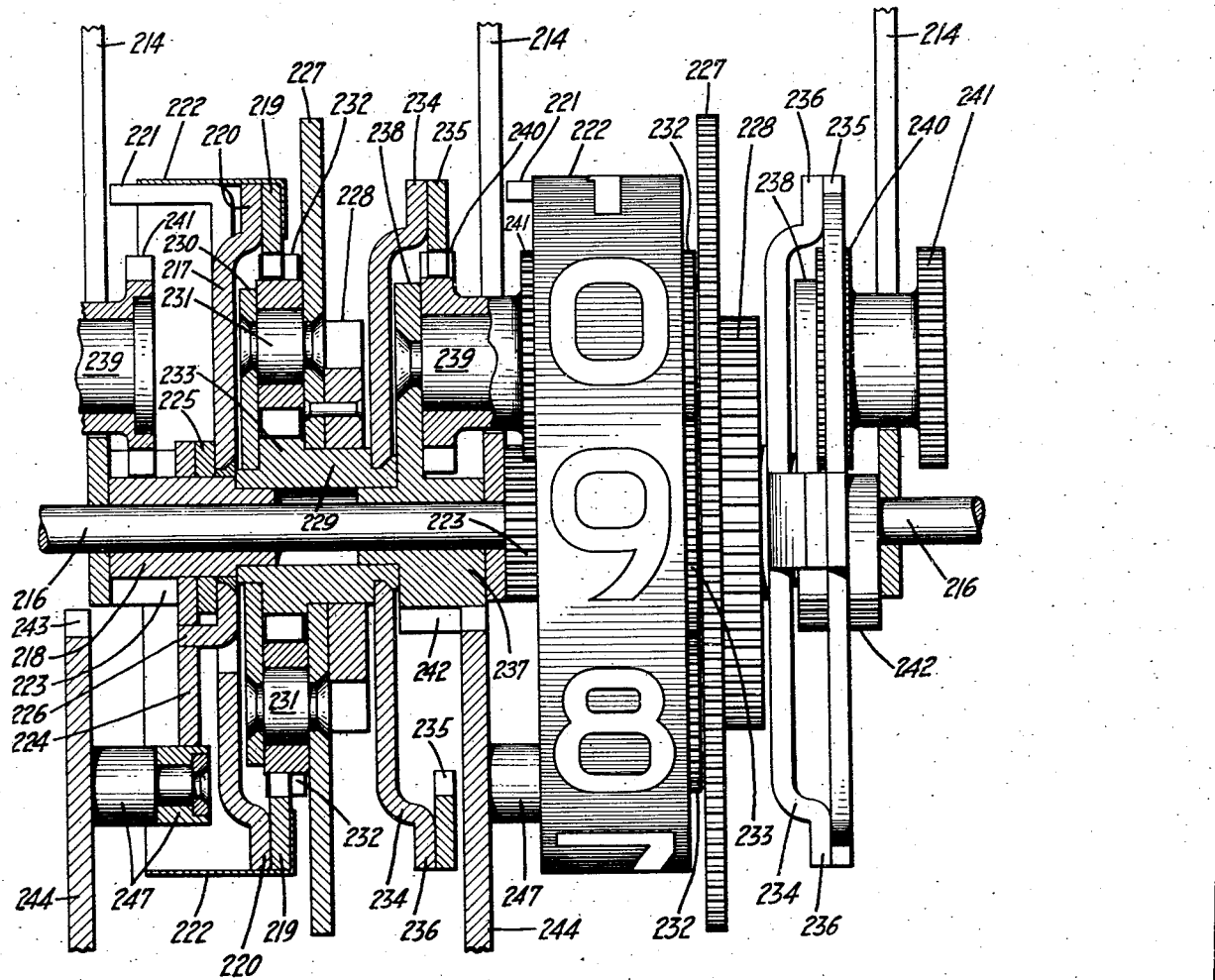

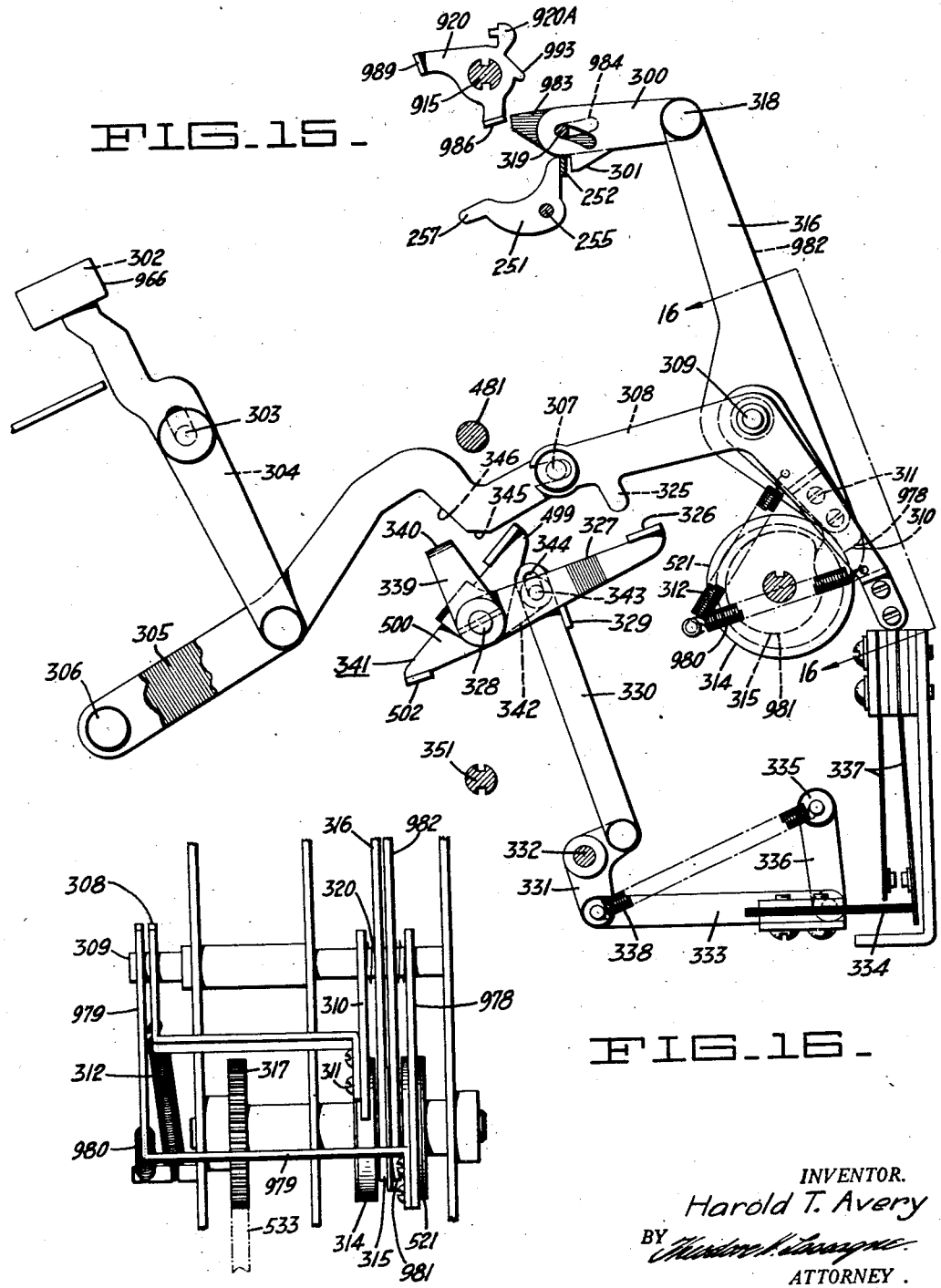

Jan. 28, 1941.  H. T. AVERY  2,229,630
CALCULATING MACHINE
Filed Jan. 23, 1933   22 Sheets-Sheet 10

INVENTOR.
Harold T. Avery
BY
ATTORNEY.

Jan. 28, 1941.  H. T. AVERY  2,229,630
CALCULATING MACHINE
Filed Jan. 23, 1933   22 Sheets-Sheet 11
FIG.22.
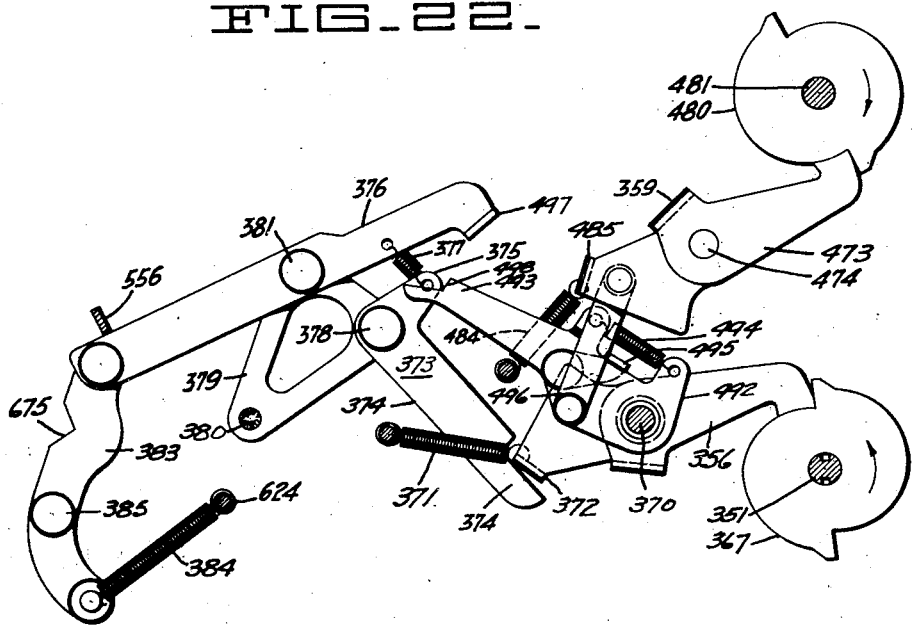
FIG.23.
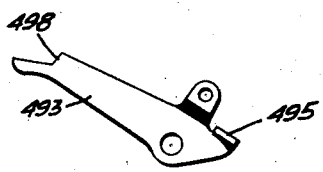
FIG.24A. FIG.24B.
FIG.21A.
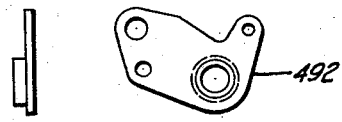
FIG.21B.
INVENTOR.
Harold T. Avery
BY
ATTORNEY

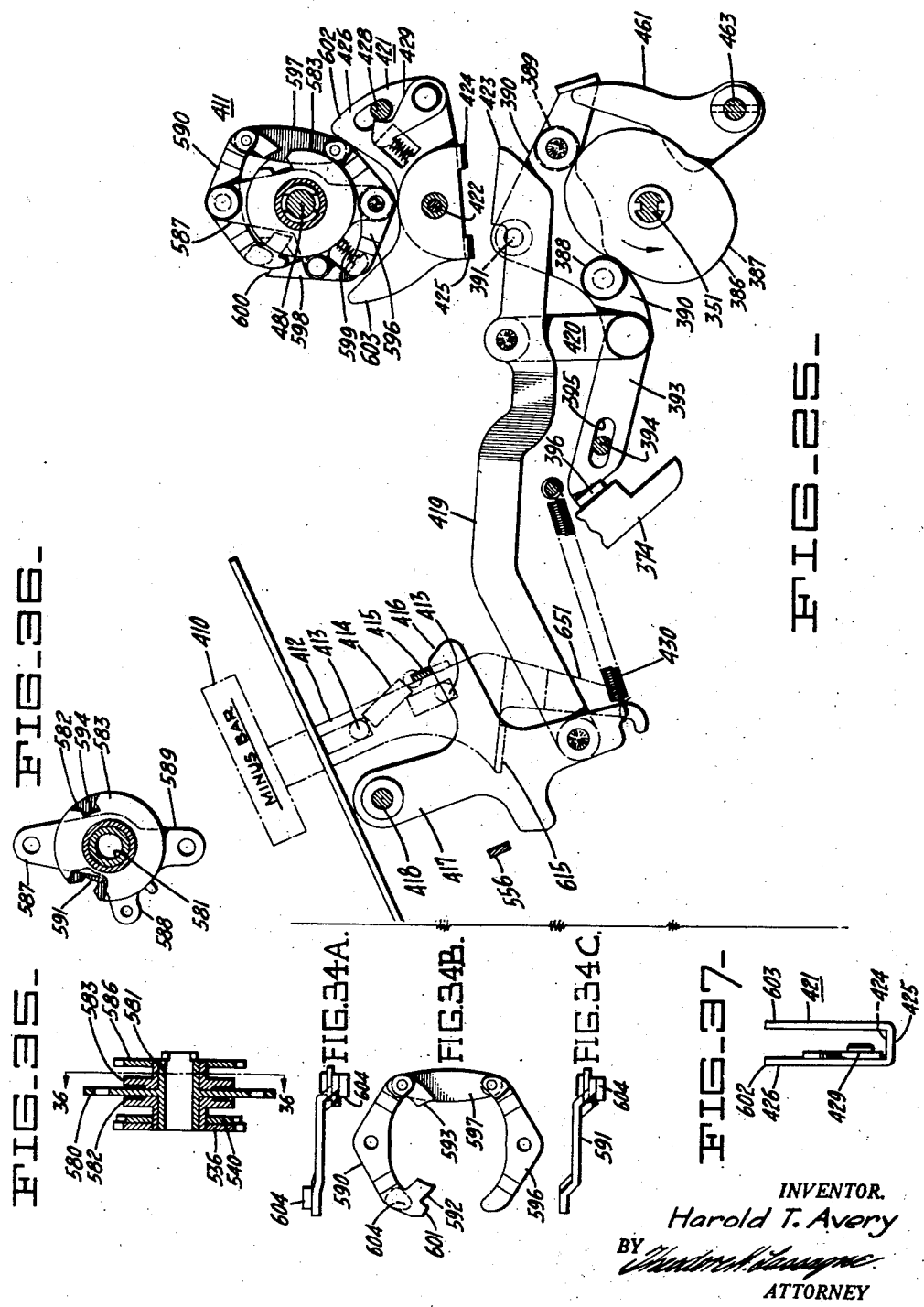

Jan. 28, 1941.  H. T. AVERY  2,229,630
CALCULATING MACHINE
Filed Jan. 23, 1933  22 Sheets-Sheet 13
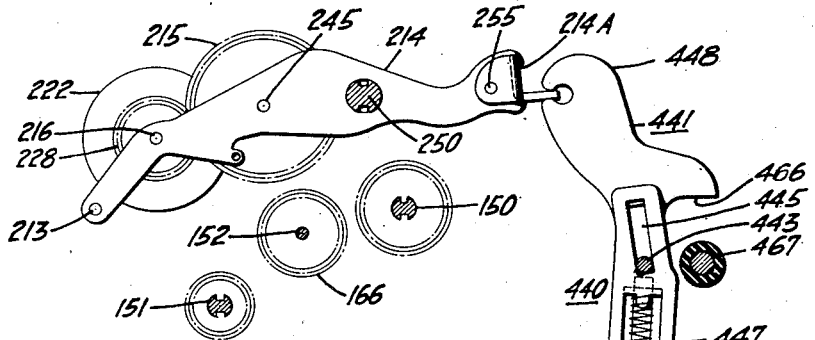
FIG_26_
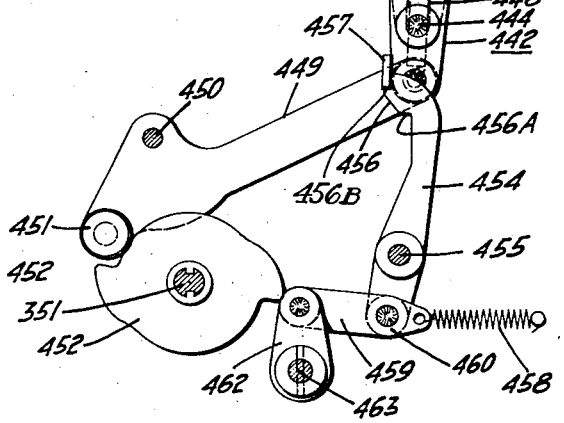
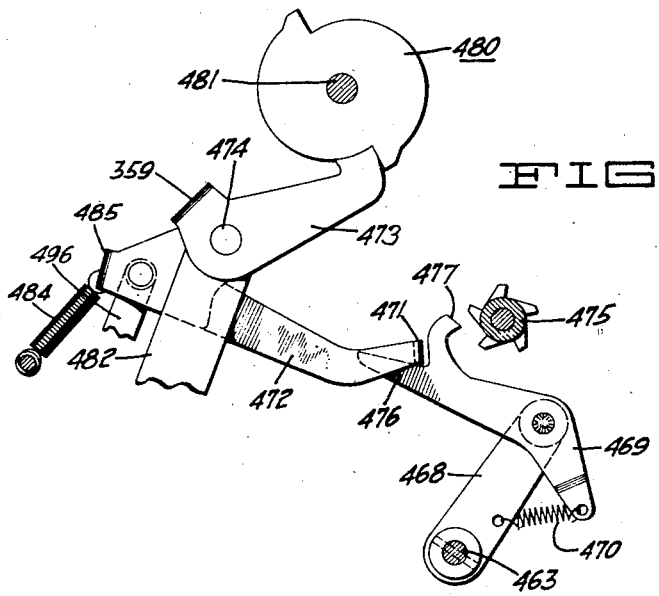
FIG_27_
INVENTOR.
Harold T. Avery
BY
ATTORNEY.

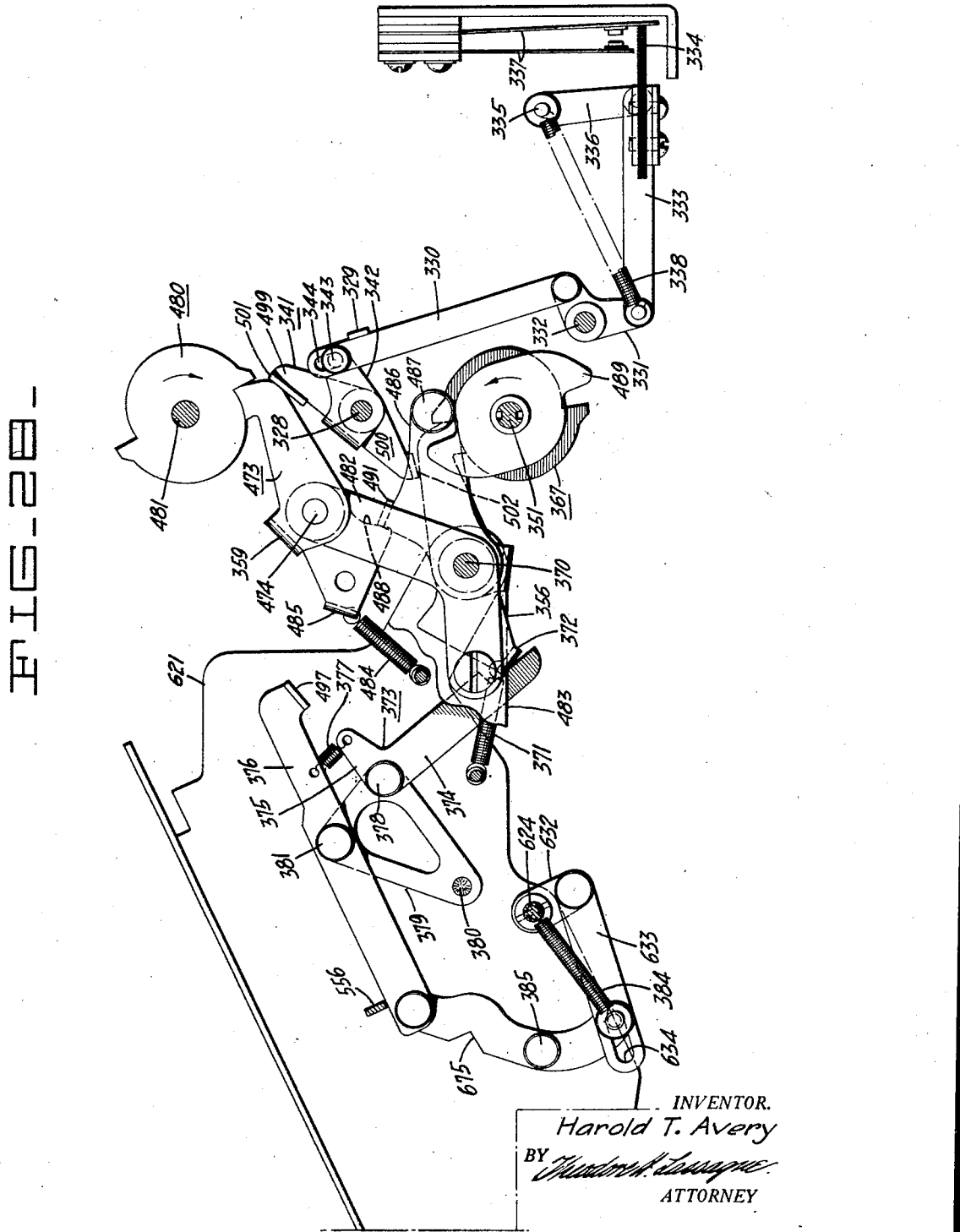

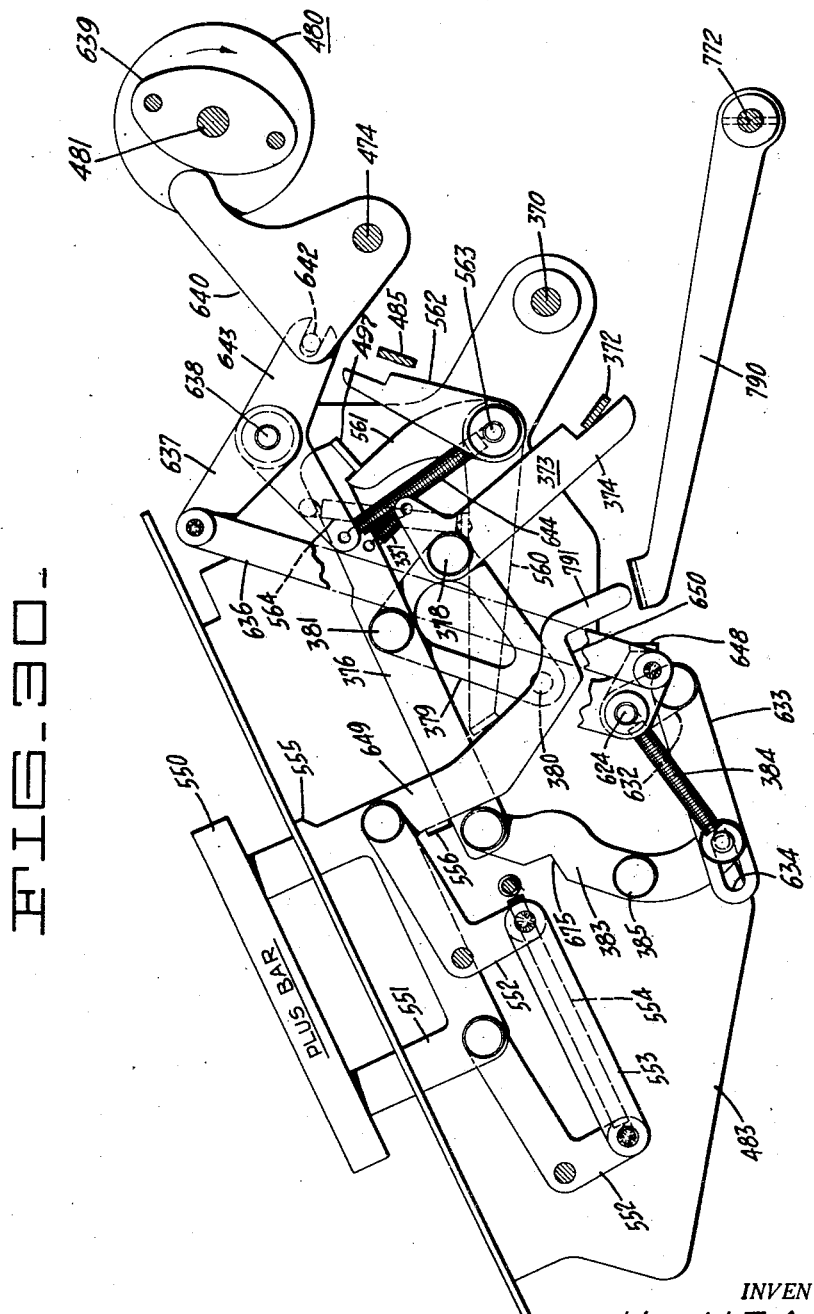

Jan. 28, 1941. H. T. AVERY 2,229,630
CALCULATING MACHINE
Filed Jan. 23, 1933 22 Sheets—Sheet 16
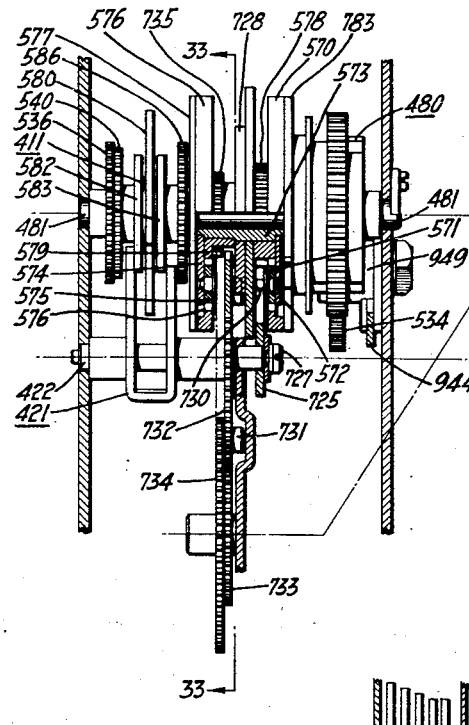
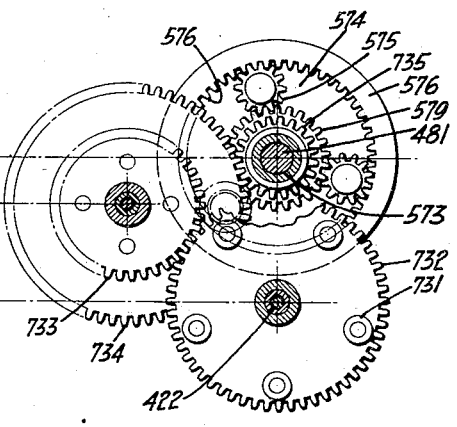
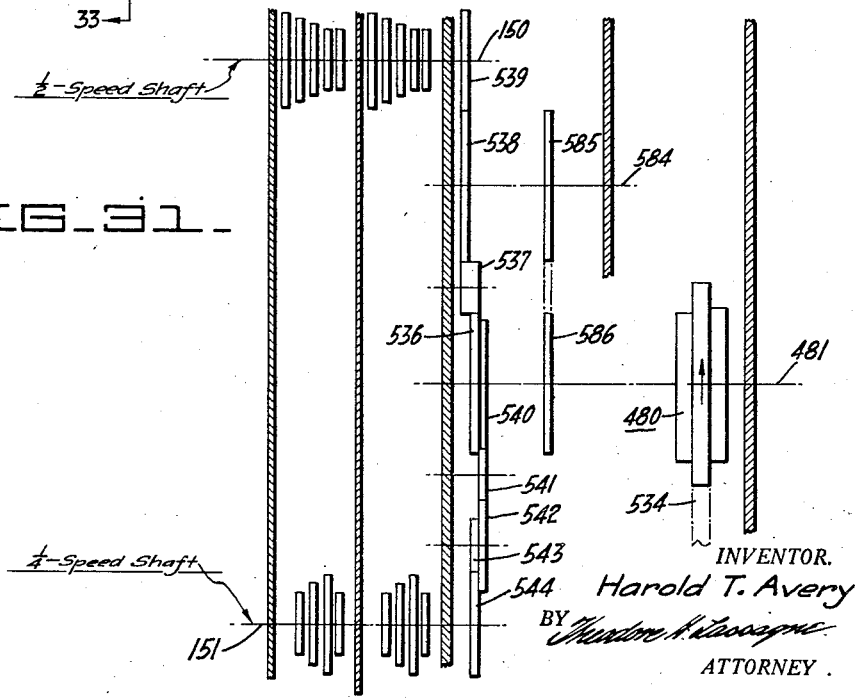
INVENTOR.
Harold T. Avery
BY
ATTORNEY.

Jan. 28, 1941.  H. T. AVERY  2,229,630
CALCULATING MACHINE
Filed Jan. 23, 1933   22 Sheets-Sheet 17
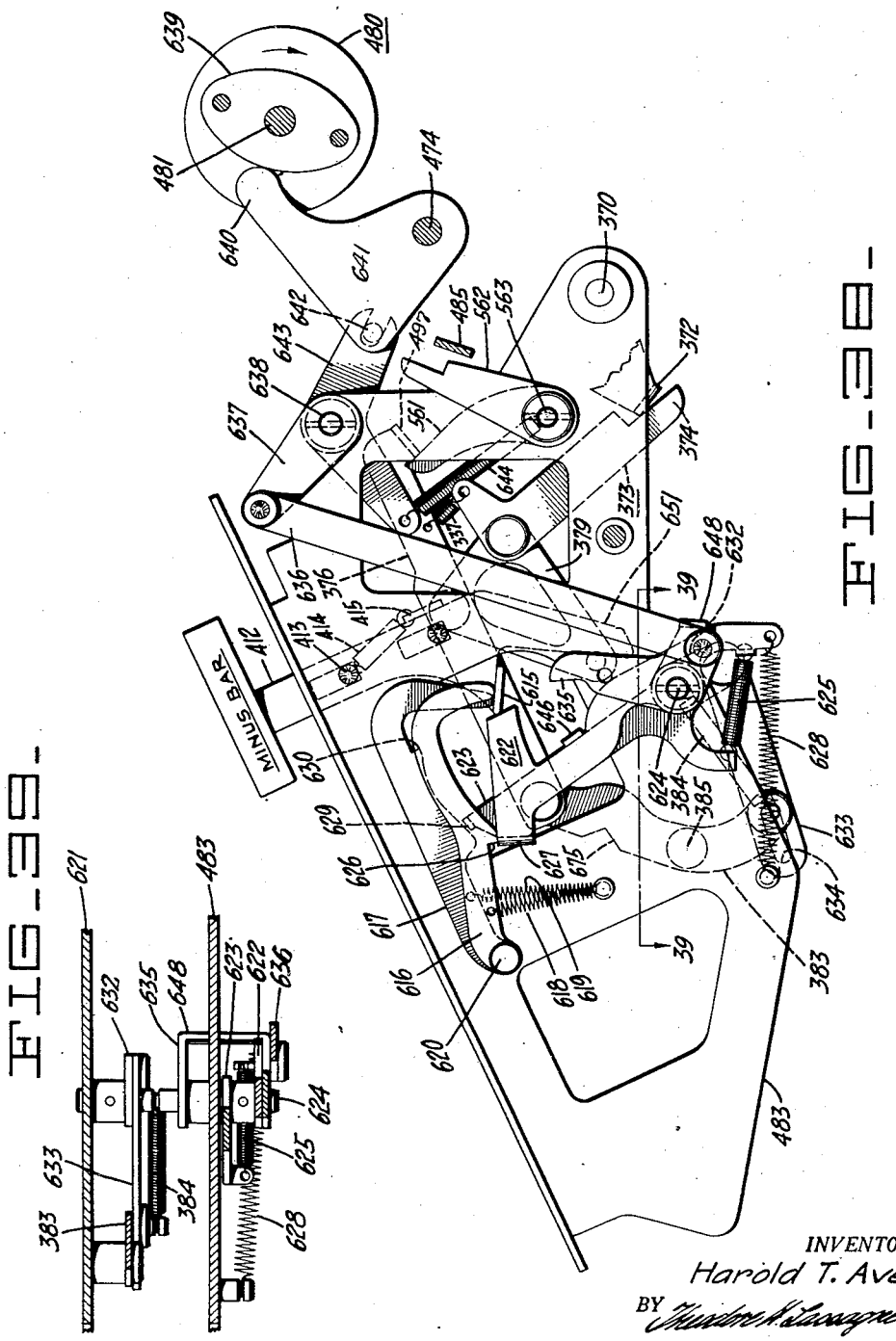
INVENTOR.
Harold T. Avery
BY
ATTORNEY.

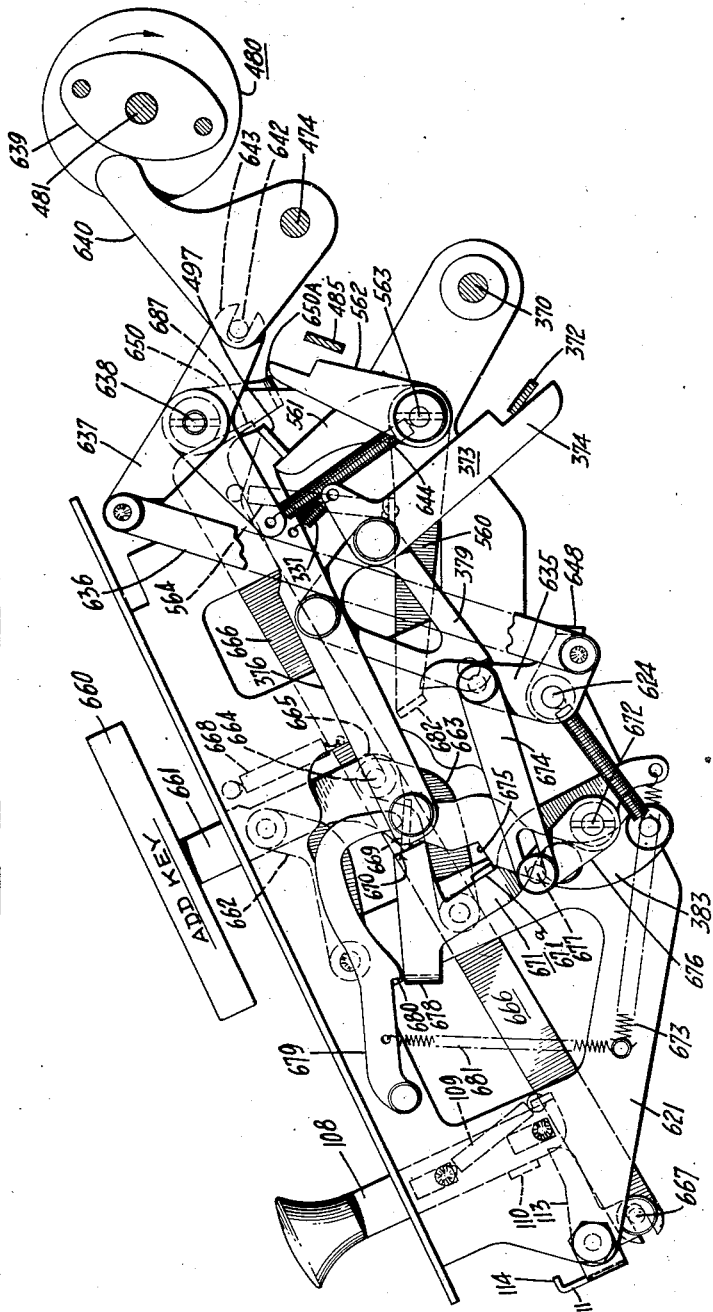

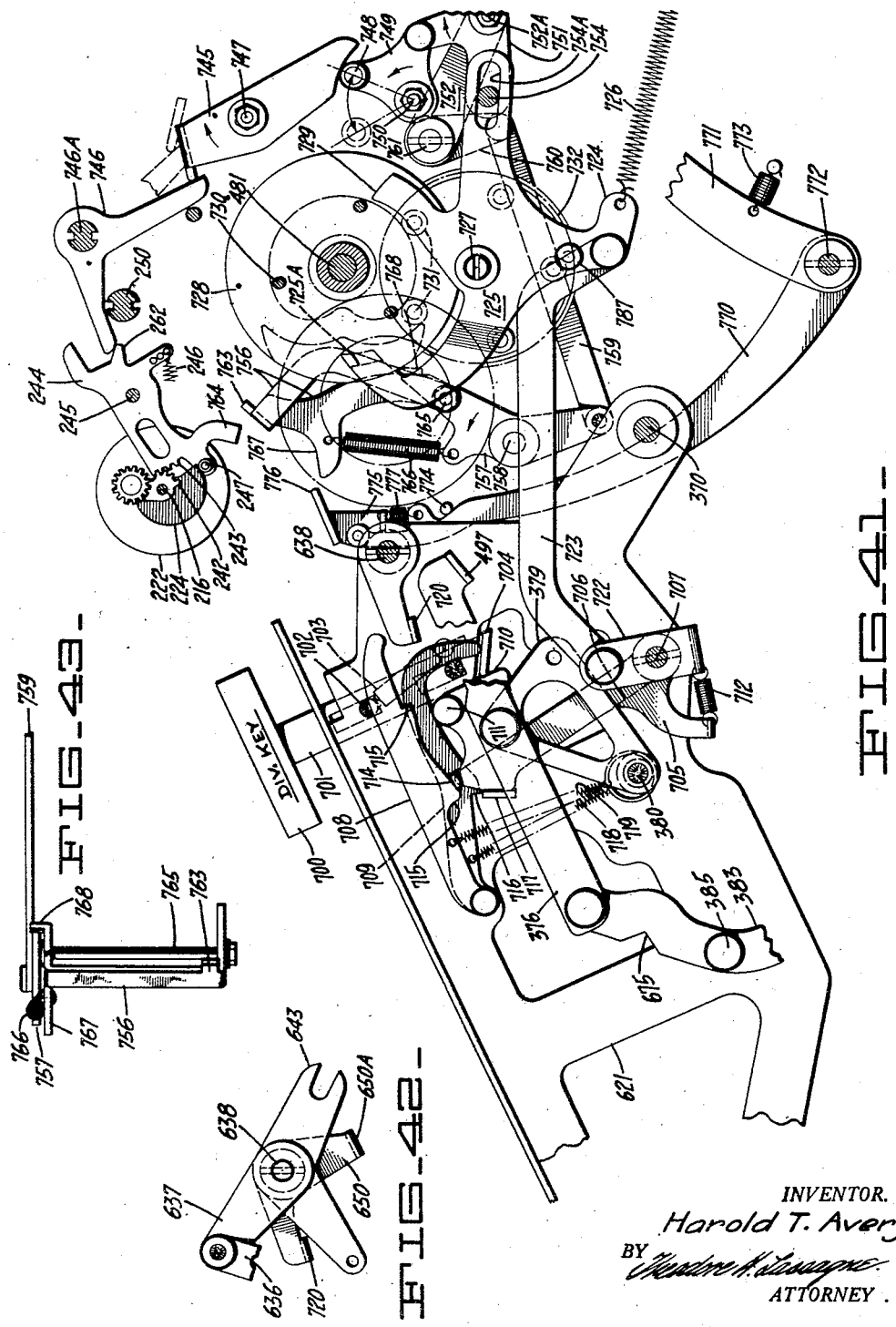

Jan. 28, 1941.    H. T. AVERY    2,229,630
CALCULATING MACHINE
Filed Jan. 23, 1933    22 Sheets-Sheet 20
FIG_46_ 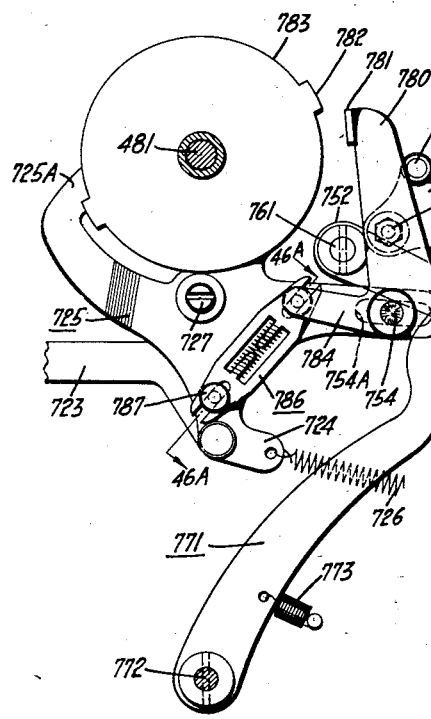
FIG_47_ 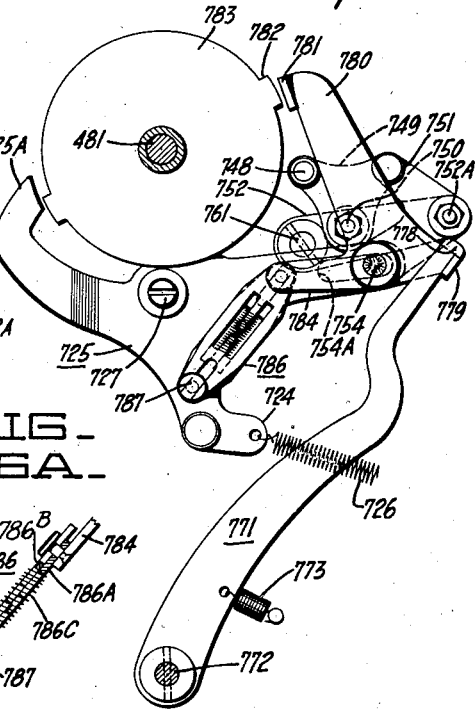
FIG_46A_ 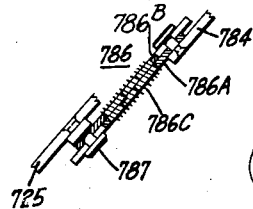
FIG_45A_ FIG_45B_ 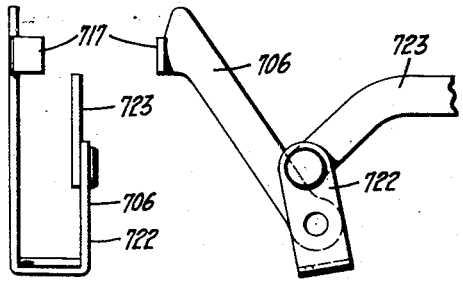
FIG_44A_ FIG_44B_ 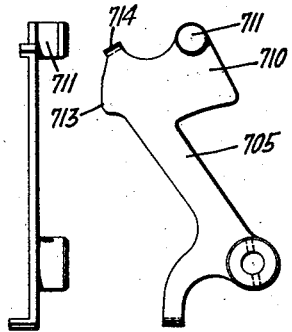
INVENTOR.
Harold T. Avery
BY
ATTORNEY.

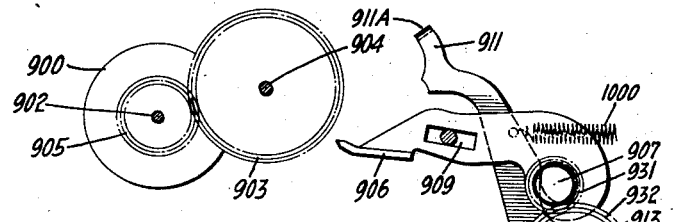
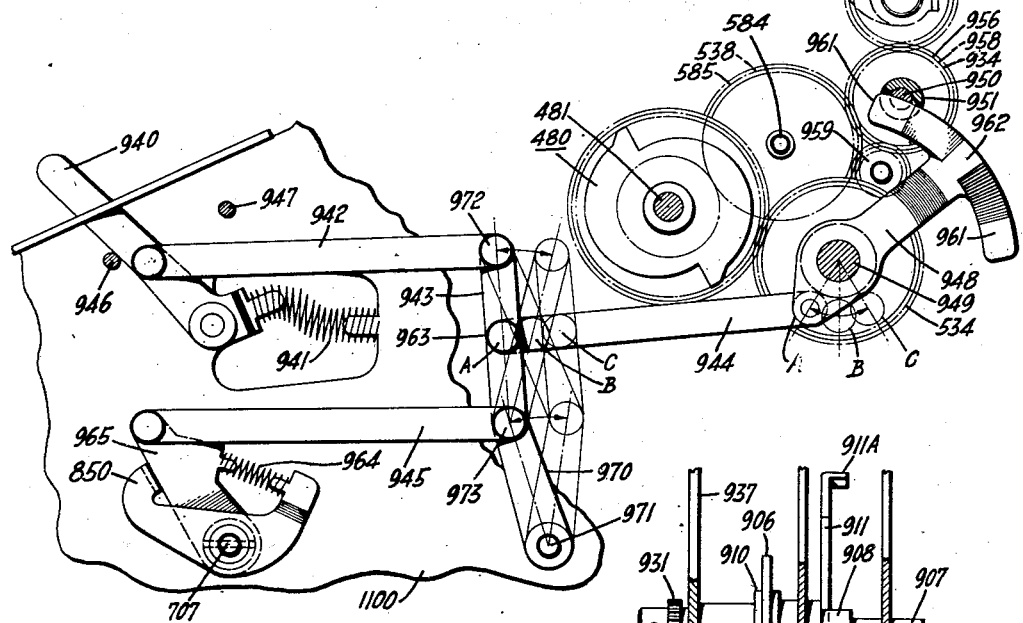
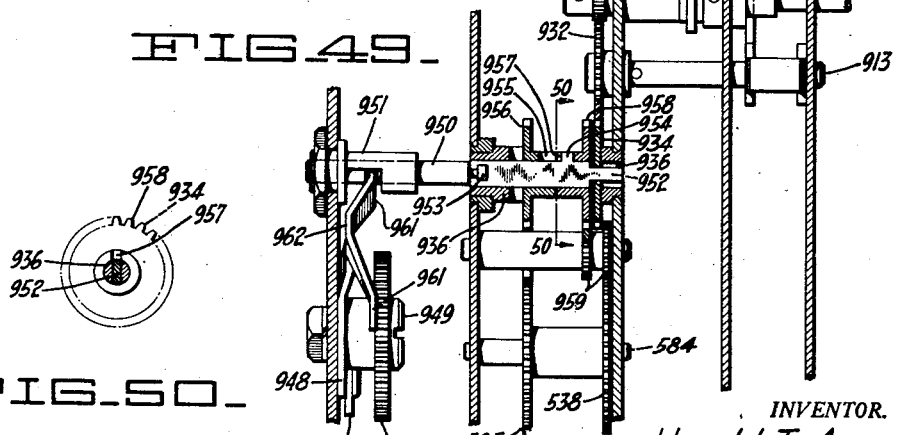

Jan. 28, 1941.  H. T. AVERY  2,229,630
CALCULATING MACHINE
Filed Jan. 23, 1933  22 Sheets—Sheet 22

INVENTOR.
Harold T. Avery
BY
ATTORNEY.

Patented Jan. 28, 1941

2,229,630

UNITED STATES PATENT OFFICE 2,229,630

CALCULATING MACHINE

Harold T. Avery, Oakland, Calif., assignor to Marchant Calculating Machine Company, a corporation of California Application January 23, 1933, Serial No. 653,207

11 Claims. (Cl. 235—79)

The invention relates to calculating machines adapted to perform the four cardinal calculations of addition, subtraction, division, and multiplication. The invention is generically concerned with the improvement of calculating machines, particularly to the end that speed of operation may be materially increased and it is the general object of the invention to provide such a machine.

The invention is also concerned with the reduction of noise of operation of the machine, even though the speed of the machine is materially increased, and another general object of the invention is to provide a very quiet running machine. The preferred means for obtaining this object includes mechanism operating to continuously drive the registering elements during addition, subtraction, and multiplication operations so that a continuous running machine is provided and the noise attendant upon intermittent driving is obviated.

Another object of the invention is to permit the power of the motor to be utilized to perform all possible operations and to require manual effort on the part of the operator to the least possible extent. Thus the machine of the present invention requires manual effort on the part of the operator only sufficient to select an operation, the motor furnishing power and carrying through the selected operation automatically to completion.

Another object of the invention is to provide an improved keyboard construction, and a decimal indicating means for the keyboard and its indicating dials.

Another object of the invention is to provide a selecting mechanism permitting clearing of the keyboard during calculation and enabling a value to be placed in the machine while the machine is operating upon a previously selected value.

Another object of the invention is to provide an improved and continuous actuating mechanism for an accumulator register, with carryover mechanism operating to its full capacity.

Another object of the invention is to provide an accumulator register which can be successfully operated either continuously or intermittently and at different speeds.

Another object of the invention is to provide an accumulator register which can be driven by suitable means continuously at one speed in one direction and intermittently in another direction to enter the same amount during its intermittent movement as during continuous driving.

Another object of the invention is to provide an improved accumulator carriage construction, having a full capacity carryover mechanism operable in all carriage positions and without independent actuation.

Another object of the invention is to provide an improved dial construction.

Another object of the invention is to provide a dial assembly line which can be quickly assembled so that all dial units in the line are in proper timed relationship to each other and so that the component parts of each dial unit are in proper timed relationship to one another.

Another object of the invention is generally to provide means enabling the power from the motor to be utilized to carry out any selected operation, the only manual effort required being that on the part of the operator to make the selection.

Another object of the invention is to provide a transmission unit for delivering power continuously in one direction and intermittently at a higher speed in another direction.

Another object of the invention is to provide an improved reverse unit between two power transmitting elements.

Another object of the invention is to provide means operable upon cessation of motor operation to operate an operation control unit, particularly means utilizing the inertia of the motor armature.

Another object of the invention is to provide an improved compression spring link construction.

Another object of the invention is to provide an improved counter control mechanism.

A further object of the invention is to provide a novel frame construction, particularly one enabling relatively light plates to be secured together in an accurate and rigid manner to the end that a frame of light plates can be constructed successfully to replace a heavy casting.

Another object of the invention is to provide an improved carriage shifting mechanism.

The invention possesses numerous other advantageous features and objects, some of which, with the foregoing, will appear at length in the following specification wherein the preferred form of the invention has been disclosed.

In the drawings accompanying and forming a part of the specification,

Figure 1 is a perspective of the assembled machine.

Figure 2 is a side view, partly in section, showing a keyboard construction and a portion of the selecting mechanism.

Figures 2A to 2E, inclusive, illustrate the construction of the five selection cams employed to set the selection plates to enter a selected value into the machine.

Figure 2F is a schematic view illustrating the relationship between the cam surfaces sensed by the selection mechanism.

Figure 3 is a view in side elevation illustrating the locking of the selection plate.

Figure 4 is a view on the line 4—4 of Figure 2, illustrating the key construction.

Figure 5 is a transverse section illustrating the construction of the indicating dial.

Figure 6 is a plan view, partly in section, illustrating the construction of the keyboard and the relationship of the keyboard to the selecting mechanism.

Figures 7A to E inclusive are views illustrating the relationship between the quarter and half speed shaft, the selection plates, and the various selection gears.

Figure 8 is a plan view of the carriage, a portion of the cover being cut away to illustrate the counter dial line and the accumulator dial line.

Figure 9 is a view on line 9—9 of Figure 8.

Figure 10 is a perspective of means employed in the counter for interconnecting elements of the counter.

Figures 11, 12, and 13 are sections taken through the carriage and illustrating various constructions therein.

Figure 14 is a view illustrating the dial assembly and a section through the assembly showing the various components thereof.

Figure 15 is a view illustrating the accumulator clear mechanism and the counter clear mechanism.

Figure 16 is a view along the line 16—16 of Figure 15.

Figure 17:
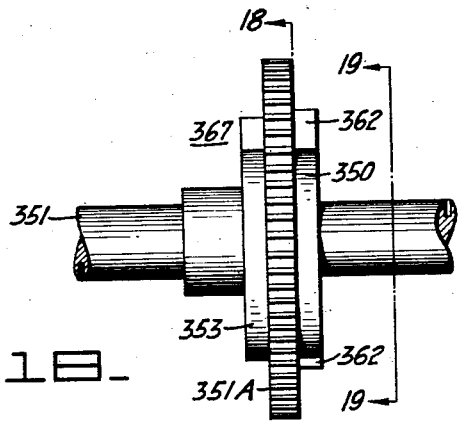

Figure 17 is a plan view generally illustrative of the clutch mechanisms employed.

Figure 18:
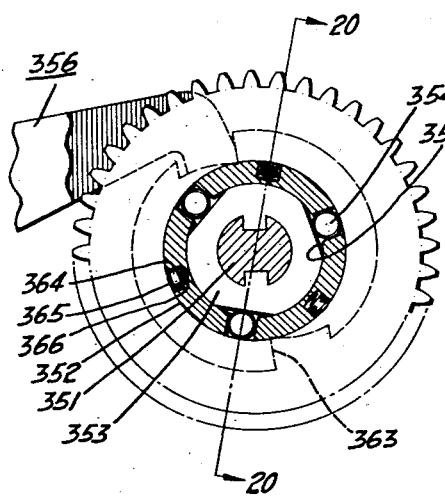
Figure 19:
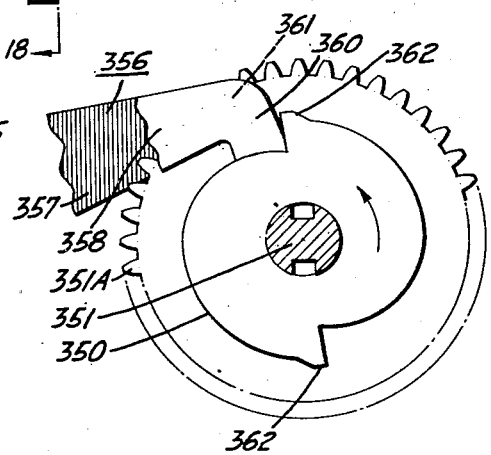

Figure 18 is a section along the line 18—18 of Figure 17, while Figure 19 is a view along line 19—19 of Figure 17.

Figure 20:
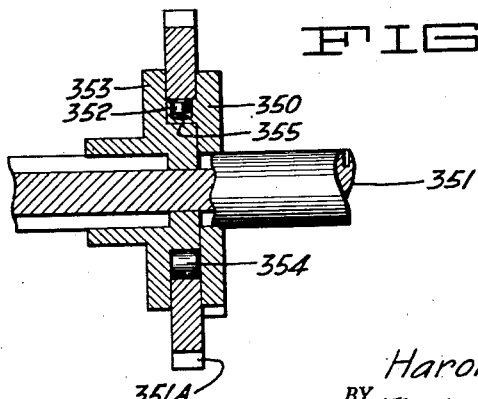

Figure 20 is a sectional view along the lines 20—20 of Figure 18.

Figures 21A and 21B are a plan and a side elevation, respectively of a clutch dog.

Figure 22 is a side elevation of the main clutch control mechanism and setting clutch control mechanism and of the means whereby the setting clutch can control and operate the main clutch.

Figure 23 is a side elevation of one of the control elements shown in Figure 2.

Figures 24A and 24B are end and side elevations, respectively, of another of the control elements shown in Figure 2.

Figure 25 is a side elevation of the minus bar and the control mechanism of the main reverse unit.

Figure 26 is a view illustrating the means for raising and lowering the dipping carriage of the accumulator.

Figure 27 shows the mechanism for releasing and restoring the carriage to raised position after it has been lowered.

Figure 28 is a side elevation showing the control of the motor by any one of the operation control keys and the interlock between various of the devices.

Figure 29 is a view illustrating diagrammatically how power is delivered from the motor to the various units.

Figure 30 illustrates the plus bar in its control over the operating mechanism.

Figure 31 is a view illustrating diagrammatically how power is delivered to the quarter and half speed shaft.

Figure 32 is a view partly in section illustrating the main clutch, division drive mechanism, and the main reverse unit.

Figure 33 is a view along the line 33—33 of Figure 32, illustrating the relationship between the drive mechanism shown in Figure 32.

Figures 34A, 34B, and 34C are detail views of the control elements of the reverse unit.

Figure 35 is a section through a portion of the reverse unit.

Figure 36 is a section taken through Figure 35 on line 36—36 thereof.

Figure 37 is a plan view of the reverse unit control dog.

Figure 38 is a side elevation showing the minus bar and its control to the various mechanisms.

Figure 39 is a view on line 39—39 of Figure 38.

Figure 40 is a side elevation illustrating the add key and its method of control over the various operating mechanisms.

Figure 41 is a side elevation showing the division key and mechanism associated therewith actuated under the control of the division key.

Figure 42 is a fragmentary view illustrating the construction of levers carried on shaft 638.

Figure 43 is a fragmentary view illustrating the construction of one of the levers in the division mechanism.

Figures 44A and 44B are end and side elevations, respectively, of one of the levers employed in the division operation.

Figures 45A and 45B are end and side elevations, respectively, of another of the levers employed in the division operation.

Figures 46 and 47 are corresponding views illustrating the relative positions of operating mechanisms included in the division mechanism.

Figure 46A is a section through the link 786 showing the details of construction thereof.

Figure 48 is a view illustrating control of the counter and actuation of the counter.

Figure 49 is a view, partly in section, illustrating driving of the counter and the control of the counter mechanism, including the reversing thereof.

Figure 50 is a view along the line 50—50 of Figure 49.

Figure 51:
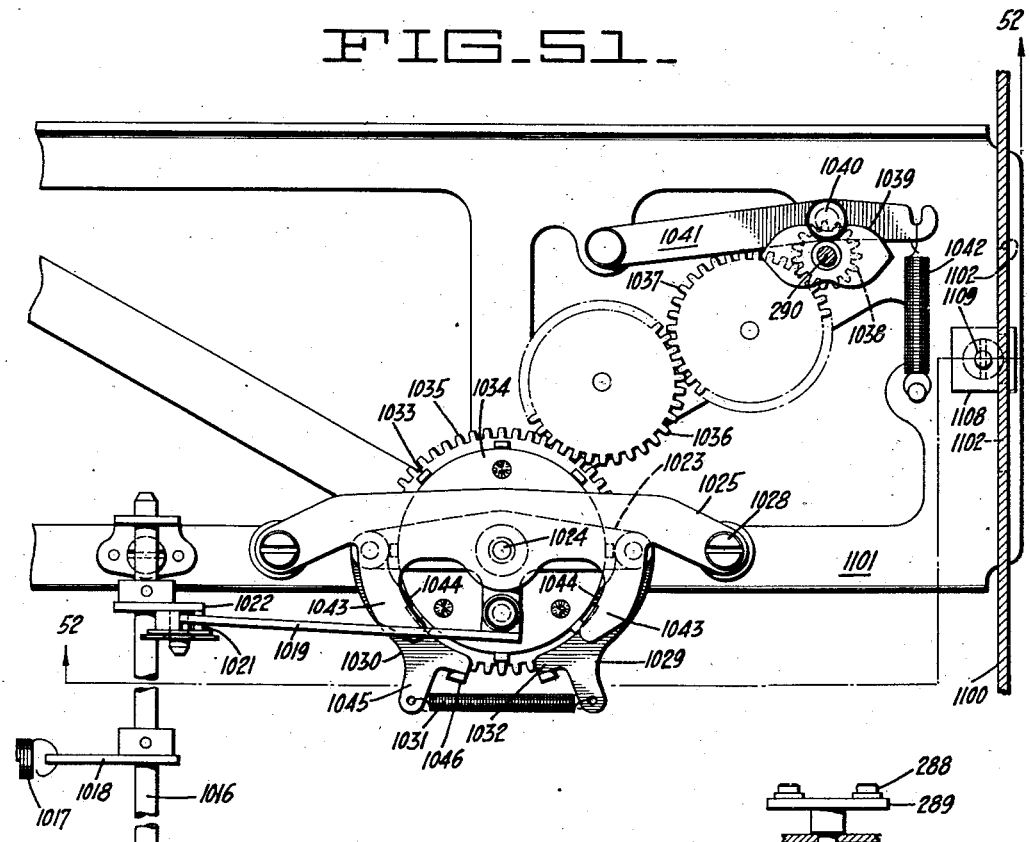

Figure 51 is a plan view, partly in section, illustrating a portion of the shifting mechanism.

Figure 52:
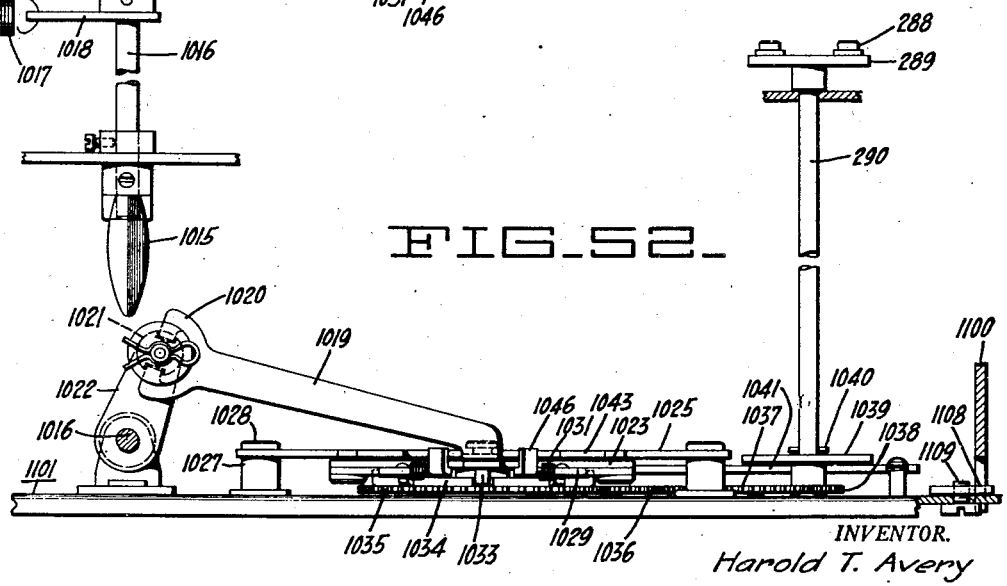

Figure 52 is a section along the line 52—52 of Figure 51.

The following copending applications claim certain subject matter disclosed but not claimed in the present application: Serial No. 84,927 filed June 12, 1936; Serial No. 104,471 filed October 7, 1936; Serial No. 228,613 filed September 6, 1938; Serial No. 305,311 filed November 20, 1939; Serial No. 313,918 filed January 15, 1940; Serial No. 314,597 filed January 19, 1940; Serial No. 315,055 filed January 22, 1940; Serial No. 329,281, filed April 12, 1940; Serial No. 352,289 filed August 12, 1940; and Serial No. 368,299 filed December 3, 1940.

The machine of the present invention is so constructed that it operates at a very high speed as compared to present machines, and is so quiet that means must be provided to enable the operator to sense when an operation has taken place because of the substantially entire elimination of cyclic noise. In addition, the machine minimizes the manual effort required on the part of the operator, power means being provided for carrying into effect any indicated operation, the operator only being required to provide sufficient manual effort to indicate a choice as to the particular operation to be performed and the values to be utilized. These features of the invention, together with features previously mentioned, as well as others presently to be disclosed, will now be taken up.

*Manually set selection mechanism*

The present machine is of the key set type in which means are provided for first setting one factor of a calculation upon a keyboard or equivalent mechanism, and subsequently operating the machine in a manner indicated by the character and amount of another factor of the calculation.

The mechanism for setting up the first factor may be considered as comprising a manually operated and a power operated portion, the manually operated portion being designed to be moved to a selected controlling position by the depression of keys or equivalent mechanism, and the power operated portion being designed to be brought into operation immediately prior to the operation of the calculating mechanism and to act under the control of the manually set mechanism to move elements of the calculating mechanism to the proper position to cause operation thereof to enter the value set up on the keyboard. By such a division of the function of setting the first factor into the machine, resistance to the depression of the keys is considerably diminished. The keys can be released and started on their return to their raised position as soon as the power operated portion of the machine acts. This enables very rapid operation for the keys are returning to position during operation of the calculating mechanism and their return is not delayed until that mechanism has operated fully. Since the keys are not relied upon to hold the calculating mechanism in proper adjustment during a calculation, the first factor of a subsequent calculation may be set up on the keyboard while the first calculation is being performed by the machine thus speeding up the machine additionally.

In a machine designed for calculation in the decimal system, the keys are preferably arranged, as shown in Figure 1, in a series of banks of ten keys each, the number of banks provided in each machine depending upon the magnitude of the factors with which the machine is designed to deal. The construction of one bank of keys is shown in Figures 2 and 4 on Sheet 2 of the drawings.

Each key section comprises the usual number of value keys 100, which are slidably mounted in a channel key frame 101 and are normally maintained in raised position by suitable coil springs 102. The key stems 100 are assembled into the channel frame 101 (see Figure 4) by insertion from the top, the slot in the upper side of the channel member being of sufficient width to pass the projection 115 of the key stem, but the registering slot in the lower side is of lesser width, preventing the key stem from dropping through and also providing a limiting stop in operation of the mechanism.

After insertion of the key stems, strip 116 is secured in place by means of screws 117, thus blocking a portion of the upper slot and preventing withdrawal of the key stems. Strip 116 also carries a strip 118 of rubber or other resilient material against which projections 115 abut when the key stems 100 are pressed upward by their springs. This serves to diminish the noise ordinarily incident to the release of keys from their latching means.

All the key stems are of the same length and each has a cam extrusion 103 which, upon depression of the key, pushes a spring pressed key locking slide 104 to the rear. Upon full downward depression of the respective key stem, this slide, pressed forward by spring 105, snaps back to initial location locking the depressed key. The first key in each section is the zero or row clear key and has a longer extrusion 106 on its stem so that it cannot be locked down by said slide 104 upon depression, but will hold the slide in its rearward position as long as the key is held depressed thus releasing any other depressed key 100 in that particular key section. Lug 115 also acts as a limiting stop when the key is depressed.

Besides the individual clearing keys for each key section described above, another clear key (shown in Figure 40) is provided, which upon depression will release every depressed key on the keyboard. This clear key 108, normally maintained in raised position by spring 109, is provided with a lug 110 which operates the gate 111 (see also Figure 2) extending across the full width of the keyboard and journaled on studs 112 fixed in the frames. This gate is provided with an arm 113 underlying lug 110 and is provided on its upper edge with an angular rearwardly extending projection 114 disposed directly in front of all the key retaining slides 104. Thus, whenever said clear key 108 is depressed the gate 111 will be rocked in a clockwise direction about studs 112 moving all slides 104 to the rear and releasing all latched keys.

Between each bank of keys, a flat decimal marker 107 is mounted (see Figure 1), so journaled at its ends that it may be rotated by means of a knurled finger piece 119 to expose either of its sides. As is well known, one side of these markers is colored to correspond with the coloring of the tops of channels 101 while their other side is colored to contrast therewith, so that by turning selected markers the keyboard may be set off in any desired manner.

Disposed underneath each key section frame is a differentially settable bar 120 which is pivotally suspended from the key section frame 101 by means of two parallel links 121 and 122. This bar 120 has ten identical notches 123, each of which has at its bottom a downwardly extending slot 124 adapted to receive the end of a key stem 100. The vertical center lines of key stems 100 are spaced an equal distance apart. This distance, however, is slightly less than the spacing between successive slots 124 so that with the first slot 124 lined up with the first key stem (this being the zero key) each succeeding slot 124 will be spaced one increment further away from its cooperating key stem. This spacing is proportioned in such a way that depression of a value key will cam the bar 120 to the rear, a number of increments equal to the value represented by the depressed key. This movement is transmitted to a pinion gear 125 by the arcuate rack 126 which is preferably integral with the rearward suspension link 122.

The gear 125 is rotatably mounted upon a common shaft 127 which supports the corresponding gears associated with the other key banks. Also mounted upon said shaft and fixed to said gear 125 is a gear 128 which serves to transmit the movement of the differential bar 120 to a check dial 130 positioned in alinement with the check dials associated with the other key sections so that the value set up on the entire keyboard may be read in a straight line of dials, and to a cam unit 146 which is positioned by such movement as to form a mechanical representation of the number set up whereby the calculating mechanism may be accordingly controlled as hereinafter set forth.

One of the check dial assemblies is shown in detail in Figure 5 and comprises a cylindrical shell 130 carrying numerals from zero to nine on its periphery (see also Figure 6) and secured to a gear 131 adapted to mesh with gear 128 whereby dial 130 is rotated upon its supporting shaft 132 an amount proportional to the movement of differential bar 120 and will display through the sight opening 133 a figure indicating the value of the depressed key 100. The sight opening 133 is formed in a shielding plate 134 covering said check dials 130 which plate is also provided with decimal point sight openings 135 exposing the rear end of the keyboard decimal bars 107 which are colored on one side to correspond to the color of plate 134 and on the other side to contrast therewith. By this arrangement, the check dials will be automatically pointed off decimally to correspond to the pointing off of the keyboard as hereinbefore described. On the rear edge of shielding plate 134 lugs 136 are formed downwardly for the purpose of preventing backward rotation of said dials 130 beyond their zero point, where a lug 137 carried by said dials will engage therewith.

The above mentioned cam units 146 are driven through gear 128 by means of an idler gear 140, said idler being provided with a pin 141 to which is connected a spring 142 tensioned between said pin and a point on the frame of the machine to return differential bar 120 and its associated parts to their zero position.

Each selection cam unit is composed of a gear 145 meshing with idler gear 140, and five differently shaped cams 146 (Figures 2, 2A to 2E, and 6), which are fixed to said gear journaled coaxially therewith on shaft 147 and staggered about said shaft. Spacers disposed between the various cams, provide suitable clearance for the sensing operation by cooperating feeler arms to be hereinafter described.

Each cam 146 has two high points 148 and two low points 149 on its contour. The two high points represent each one numeral of the numerals represented by the keys 100 and the two depressions are the complementary positions thereof provided to insure positive action of the sensing mechanism.

In addition to the value keys 100 and clear keys, the keyboard includes the following operation control keys for initiating and controlling machine operations; the add key 660 for initiating one plus machine operation and then clearing the keyboard (Figures 1 and 40); the plus bar 550 (Figures 1 and 30) for operating the machine positively while said bar is depressed; the minus bar 410 (Figures 1 and 25); the division key 700 (Figures 1 and 41); accumulator clear key 302 and counter clear key 966 (Figures 1 and 15) and the counter reverse lever 940 (Figures 1 and 48). These control various machine operations, the manner and nature of which will be set forth hereinafter. These operation control keys, and mechanism associated therewith, are mounted upon supporting plates 621 and 483. These are provided within the confines of the main frame of the machine, plate 483 being along the right hand side of the machine (Figure 1) while plate 621 is parallel thereto but spaced therefrom.

*Power set selection mechanism*

After the setting of the mechanism heretofore described has been completed and upon depression of one of the operating bars, the power operated portion of the selection mechanism is brought into operation prior to operation of the calculating mechanism, and acts, under control of the cams 146, to move elements of the calculating mechanism to the proper position to condition it for effecting entry of the value set up on the keyboard into the accumulator.

It is an important and distinguishing feature of the present machine that throughout the performance of a calculation the registering elements are continuously driven by the prime mover, the entry of different amounts being effected by mechanism for selectively varying the rate at which each registering element may be driven by the prime mover.

This mechanism comprises two shafts 150 and 151 (Figure 6) common to all orders of the machine, and connected to the prime mover through gearing and a cyclic clutch as hereinafter described, so that shaft 150 rotates through 180° for each cycle of operation of the machine, while shaft 151 rotates through 90° for each cycle of operation of the machine. These shafts, as well as the other shafts used in the selection mechanism, are supported between base plates 129 (Figure 6). A series of sleeves 153, one for each decimal order, is freely mounted on a common shaft 152 disposed between the shafts 150 and 151 and each sleeve carries a gear for driving the several orders of the registering mechanism, as hereinafter described.

Means are provided for connecting each of the several sleeves 153 so that it may be either locked or driven by either shaft 150 or shaft 151 at any of nine different rates with respect to the prime mover, said rates corresponding to the values delineated upon keys 100. Since this mechanism is duplicated in each decimal order of the machine, only one of these orders will be herein described.

Keyed to sleeve 153 toward the left end thereof (Figure 6) is a gear 154 (see also Figures 2 and 7A) and mounted to freely oscillate upon said sleeve alongside said gear 154 is a selection plate 155 having a stud 156 upon which is rotatably mounted an idler gear 157 meshing with gear 154. Keyed to shaft 150 in radial alinement with said gears 154 and 157, is an eighteen-tooth gear 158, while in radial alinement with gear 157 on its opposite side is a tooth 159 fixed to the frame of the machine. Thus, if plate 155 be swung to the rear as viewed in Figure 2, gear 157 will be brought into mesh with gear 158 whereupon the 180° rotation of shaft 150 which takes place during each cycle of operation of the machine, will drive the gear 154 nine teeth, while if plate 155 be swung to the front, tooth 159 fixed on the frame will serve to lock gear 157 and gear 154 against rotation. By this means either a zero or a nine selection may be effected.

Also keyed to the sleeve 153 is a second gear 160 (Figures 6 and 7B) and mounted for oscillation on the sleeve alongside this gear is a second selection plate 155 carrying a similar idler 157 which in this case meshes with the gear 160. Keyed to shaft 150, in radial alinement with gear 760 and its idler 157, is a sixteen-tooth gear 161, and keyed to shaft 151, in radial alinement with gear 160 and its idler 157, is a twelve-tooth gear 162. Thus when this second selection plate 155 is swung to the rear as viewed in Figure 2, its idler 157 will mesh with the gear 161 and the 180° rotation of shaft 150 in each cycle will serve to drive the gear 160 eight teeth, while, when the said plate 155 is swung toward the front, as viewed in Figure 2, its idler 157 will mesh with the gear 162 and the 90° rotation of shaft 151 in each cycle will serve to drive the gear 160 three teeth. By this means either a three or an eight selection may be effected.

Also keyed upon sleeve 153 is a third gear 163 (Figures 6 and 7C) and mounted to oscillate freely upon the sleeve 153 alongside this gear, is a third selection plate 155 which is a substantial duplicate of the first two above described, and carries a similar idler gear 157. Keyed to shaft 150 in radial alinement with gear 163 and its idler 157, is a fourteen-tooth gear 164, and keyed to shaft 151 in radial alinement with gear 163 and its idler 157 is a sixteen-tooth gear 165. Thus, when this plate 155 is swung to the rear as viewed in Figure 2, its idler 157 will mesh with gear 164 and the 180° rotation of shaft 150 in each cycle will serve to drive the gear 163 through seven teeth, while, when this plate 155 is swung toward the front of the machine, as viewed in Figure 2, its idler 157 will mesh with gear 165 and the 90° rotation of shaft 151 in each cycle of operation will serve to drive the gear 163 through four teeth. By this means, either a four or a seven selection may be effected.

Also keyed to sleeve 153 is a broad faced gear 166 (Figures 6 and 7D) and freely mounted for oscillation upon the sleeve 153 on the left side of this gear, is a fourth selection plate 155 which is a substantial duplicate of those previously described, and carries a similar idler 157. Keyed to shaft 150 in radial alinement with this idler 157 is a twelve-tooth gear 167 and keyed to shaft 151 in radial alinement with this idler 157 is a twenty-tooth gear 168. Thus, if this idler 157 be swung to the rear as viewed in Figure 2, it will mesh with gear 167 and a 180° rotation of the shaft 150 in each cycle will serve to advance the gear 166 six teeth, while if the plate 155 be swung toward the front of the machine as viewed in Figure 2, the idler 157 will mesh with gear 168 and the 90° rotation of shaft 151 in each cycle will serve to advance the gear 166 five teeth. By this means either a five or a six selection may be effected.

Because of the large ratio of reduction necessary for effecting a one or a two selection, a slightly different arrangement is used for this purpose. Mounted for oscillation upon sleeve 153 at the right of gear 166, is a fifth selection plate 155 having, rotatably mounted thereon, intermeshing idler gears 171 and 172 (Figure 7E). Gear 172 is constantly in mesh with gear 166, while gear 171 is adapted to mesh as the plate is swung either forwardly or backwardly with either of two ten-tooth idler gears 173 or 174, rotatably mounted on studs 175 and 176, respectively, secured to the brace plate 208 in each order. Mounted coaxially with each of gears 173 and 174 and fixed thereto, are thirty-tooth gears 177 and 178 meshing with twelve-tooth gears 179 and 180, respectively, gear 179 being keyed to shaft 150 and gear 180 being keyed to shaft 151. By this arrangement, when the selection plate is swung toward the rear, as viewed in Figure 2, the 180° rotation of shaft 150 during each cycle will move gear 166 two teeth, while, if the selection plate be swung toward the front of the machine as viewed in Figure 2, the 90° rotation of shaft 151 in each cycle will move gear 166 one tooth. By this means either a one or a two selection may be effected.

It will thus be apparent that by shifting one of the selection plates 155 either toward the front or toward the rear of the machine while the others are held in central or neutral position, it is possible to predetermine a cyclic advance of the gears carried by each sleeve 153 of from zero to nine teeth. This simultaneous setting of the selection plates 155 is effected by power driven mechanism for sensing the cams 146 hereinbefore described.

This mechanism comprises a group of five feeler arms 181 (Figures 2 and 2A to 2E), one for each of the five plates 155, pivotally connected thereto at 182, and provided with a nose 183 adapted to be pressed against the cam 146 with which it is in radial alinement. These feeler arms 181 are pivotally supported on a shaft 184 supported by links 184a pivoted to the frame of the machine at 185. Each feeler arm 181 is connected by a link 186 with a second feeler arm 187 pivotally mounted on the frame at 188 and provided with a sensing nose 189 adapted to contact the same cam 146 at a point approximately 180° removed from the point at which it is contacted by nose 183. This sensing system is actuated by a plurality of pairs of complementary cams 190 and 191 adapted to be driven by means hereinafter described, and cooperating with cam followers 192 and 193 to rock levers 194 pivoted to the frame at 195 and connected by links 196 with shaft 184.

In operation, as lever 194 is rocked by these cams, each set of sensing noses 183 and 189 will be moved toward that one of the cams 146 with which it is in radial alinement, and if nose 183 meets a low point 149 of one of the cams 146, the nose 189 will meet the opposite high point 148, thereby rocking plate 155 into its forward position, as viewed in Figure 2. If, on the other hand, nose 183 meets a high point 148 of one of the cams 146, the nose 189 will meet the opposite low point 149 and the plate 155 to which arm 181 is attached will be moved into its rearward position, as viewed in Figure 2. If, in the third case, nose 183 meets only an intermediate portion and does not engage either a high or a low point of cam 146, nose 189 will do likewise, and plate 155 will be positively positioned in central or neutral position in which its idler 157 will be out of mesh with the gears on both shafts 150 and 151.

The five cams 146 composing each selection cam unit have their respective high and low points so positioned around their peripheries and are so offset with respect to each other that, if one set of the feelers 181 and 187 in each order meets either a high or a low point on one of the five cams, the other four sets of feelers 181 and 187 in the same order will not meet either a high or a low point on their associated cams. Thus, in each sensing operation, only one of the plates 155 will be rocked either forwardly or rearwardly, the other four of said plates in that order being maintained in their central or neutral position. Thus, the gears carried by each sleeve 153 can be meshed only by a single train with one of the gears carried on either shaft 150 or shaft 151, or else locked by tooth 159. By this means, any selection from zero to nine inclusive, is effected in each decimal order under the control of keys 100.

In Figures 2A to 2E are shown the five cams 146 in neutral position to set up only a zero. These cams respectively provide for setting values as follows: cam 146A, values 0 and 9; cam 146B, values 3 and 8; cam 146C, values 4 and 7; cam 146D, values 5 and 6; and cam 146E, values 1 and 2. In the set up shown, a zero value will be set up under the control of cam 146A, nose 183 moving in to low point 149 and nose 189 engaging high point 148 to move the associated selection plate 155 to the forward position, gear 157 engaging tooth 159 (Figures 2 and 7A) and all other noses engaging intermediate cam portions to position the other four plates in neutral position.

Referring to Figures 2, 2A to 2E, and 2F, it is to be noted that high points 148 correspond to the outer circle in Figure 2B and low points 149 to the inner circle, while the intermediate circle corresponds to the cam body. When the noses 183 and 189 are brought in to engage a cam, their movement is complementary in that the total movement of the two is always the same, and the distance they are finally spaced apart is always the same, it being the relative positions of the noses to the center of the cam or shaft 147 that controls the position of plate 155. Thus the noses either engage the surfaces represented by the outer and inner circles in Figure 2F, corresponding to distances A and B, and in which the associated plate is moved to a value setting position, or both noses engage the surface represented by the intermediate circle, which is a neutral plate position. Distances A, B, and C are equal but are differently arranged with respect to the center of the shaft 147. It is this difference that results in the positive selective movement of each plate 155 to one of these positions it can occupy.

Means are provided for locking selection plates 155 in the relationship above described, comprising a lock gate 197 (Figures 2 and 3) pivoted to the frame of the machine at 198 and adapted to engage one of three notches 199 in each selection plate 155 to hold said plate against movement in either direction. This locking gate 197 engages all the selection plates 155 simultaneously, and is operated by means which will be described in connection with the setting clutch mechanism hereinafter.

Accumulator mechanism

From the foregoing description of the selection mechanism, it is apparent that a number comprising a plurality of figures can be registered upon the several sleeves 153 by differentially driving the gears attached to these sleeves various distances proportionate to the quantitative relation of the several figures composing the number. However, in order to perform any mathematical computation such as addition, subtraction, multiplication, or division, mechanism must be provided for advancing a superior registering element one extra increment whenever the next lower element has made a complete rotation. This process is known as carrying the tens, in a machine operating according to the decimal system.

In the present machine this function is accomplished by accumulator mechanism mounted in a carriage 200 (Figures 1, 8, and 9) the main frame of which comprises end plates 201 connected by a top plate 202 having apertures 203 adapted to receive lugs 205 on plates 201 and secured at its forward end by screws 206 to a comb 204 embracing lugs 205 formed on end plates 201. The front carriage track plate 207, secured at its ends to the two plates 201, and the several cross shafts to be hereafter described, serve as additional bracing means for this main frame structure at the forward side. At the rear angle strip 285 extends between the end plates, being secured to top plate 202 to stiffen the rear of the carriage.

Mounted at even intervals between the two end plates 201 are a series of carriage brace plates 208 (Figures 11, 12, and 13) having lugs 209 projecting through spaced slots in the carriage track plate 207, other lugs 210 and 211 projecting through spaced slots in the main top plate 202 and secured in this position by means of the slotted comb 204 which also engages lugs 212 formed on these plates.

Supported in the end plates 201 and by the several brace plates 208, is a cross rod 213 which serves as a pivotal support for a series of plates 214, one of which is mounted on said rod 213 adjacent each of the carriage brace plates 208. These plates 214 (Figure 26) are connected together at their rear end by a common bail 214a, known as the "dipping bail," by means of which the entire body of plates 214 may be oscillated about shaft 213 during operations hereinafter described, in which description the mechanism supported by said plates 214 will be referred to as the "dipping carriage."

The units of the accumulator are assembled on a shaft 216 supported by plates 214, there being one of such plates 214 between every succeeding unit, so that each unit forms a separate assembly between two of said plates and each unit is adapted to be driven by one of the selection gears 166 (Figures 2 and 6) with which intermediate gears 215, rotatably mounted on shaft 245 and entrained with the gears 228 of the several accumulator units, may be meshed by lowering the dipping carriage as hereinafter described. Suitable clearances are provided on the several plates 214 to permit the necessary connections between the orders of the accumulator for effecting tens transfer or carry operation.

Referring more particularly to Figure 14, it will be noted that each accumulator unit comprises a spider 217 which is rigidly secured to a sleeve 218 on shaft 216. This spider 217 carries an internal ring gear 219 on its right hand side which is spot welded or riveted to the flared out portion 220 of each of the spider arms. A right angular extension 221 of one of said arms projects toward the left from said spider, slightly beyond the left side face of a thin shell 222 fixed to the spider 217 and the internal gear 219 thereon, and serves as a zero stop in resetting operations described hereafter. The periphery of said shell 222 is sufficiently wide to accommodate the digits ranging from 0 to 9 arranged as shown. Integral with the sleeve 218 surrounding said shaft 216 is a sun gear 223 abutting a plate 214 and interposed between said sun gear 223 and the spider 217 is a snail cam 224 and spacer 225. The snail cam 224, (see also Figure 12) has a small aperture into which projects a lateral extension 226 of spider 217, thus causing said cam and spider to rotate as a unit with the internal gear 219 and the sun gear 223 and preserving them in time as well as facilitating assembly.

Assembly in proper timing relationship is secured by welding the ring gear 219 to the spider 217 in a certain relationship. Snail cam 224 is broached out to the pitch line diameter of sun gear 223. When the sun gear on integral sleeve 218 is placed on the spider, the extension 226 places the snail cam relative to the internal gear so that sun gear 223, snail cam 224, and ring gear 219 are fixed in a predetermined timing position relative to each other. Assembly by skilled mechanics is thus obviated as are possible errors, for the three units assemble in only a given relationship.

Located immediately to the right of mechanism just described is a large knurled disc 227 (see also Figure 1) fixed to a spur gear 228. These elements are rotatably mounted on a sleeve 229 which in turn is rotatably mounted on the reduced portions of adjacent elements 218 and 237. The knurled disc 227 is, in turn, fixed to a member 230 by studs 231 provided at each end of said member. On each of said studs is mounted a planet gear 232 meshing with the ring gear 219 carried by spider 217 and with another sun gear 233 formed integrally with sleeve 229. Thus, the spur gear 228, the knurled disc 227, the planet gears 232, and the ring gear 219 constitute a planetary assembly which rotates about the sleeve 229 and comprises the means by which the numeral bearing shell 222 can be rotated by the actuating mechanism of the machine which drives the gear 228 as hereafter described, by the transfer mechanism as hereinafter described, or manually by means of the knurled disc 227 fixed to gear 228 and which projects through the carriage cover as shown in Figure 8.

For the purpose of carrying tens, means are provided for driving the spider 217 and its associated dial shell 222 by means of the spider 217 of the next lower order independently of any movement of gear 228.

Secured to the right end of the above mentioned sun gear sleeve 229 is a spider 234 carrying an internal gear 235 and provided with four lugs 236 which serve as stops during clearing operations as described hereinafter. A sleeve 237 which also helps to support the sleeve 229 described above, is provided with an arm 238 to which is secured a stud shaft 239 on which a double planet gear 240 and 241 can freely rotate. This double gear can be shaped out of a single piece of metal or be otherwise assembled as a single functional unit. The planet gear 240 meshes with the internal gear 235 on spider 234 while the planet gear 241 meshes with the sun gear 223 of the adjacent lower order. The part of the sleeve 237 opposite arm 238 is equipped with a gear segment 242 meshing with teeth 243 formed on a lever 244 pivoted to a shaft 245 (Figure 12) mounted parallel to the shaft 216 in the plates 214. This lever 244 is urged clockwise by spring 246 so that a roller 247 carried thereby tends to contact with the snail cam 224. In the units order the sleeve 229 is secured directly to the plate 214 adjoining it at the right inasmuch as there is no lower order from which tens must be carried.

This arrangement of the several accumulator units permits simultaneous digitation and tens transfer operations known in the art as "duplexing."

In operation, the gear 228 is driven by the actuating mechanism and revolves planetary gears 232 about shaft 216 as a center. Where, as in the units order, the sleeve 229 with its sun gear 233 is stationary, this revolution of gears 232 will, since they are in mesh with sun gear 233, cause said gears 232 to also rotate about studs 231 and thus drive ring gear 219 ahead in the direction in which gear 228 is being driven with a pitch line velocity just twice that at which the centers of stub shafts 239 are being revolved. Since ring gear 219 is fixed to the indicia bearing shell 222, this movement will bring a figure opposite the sight opening 248 in the carriage cover indicative of the portion of a rotation given gear 228.

Whenever a given amount is thus entered in any one unit of the accumulator, one tenth of that amount will be entered in the next higher unit by means of the carrying mechanism comprising sun gear 223 fixed to spider 217 and driving planetary gears 241 and 240, these, in turn, driving internal gear 235 fixed to sleeve 229 of the next higher unit in a direction opposite to that of spider 217, and, by rotating said sleeve, driving sun gear 233 integral therewith. If gear 228 and studs 231 are stationary, the movement of sun gear 233 rotates ring gear 219 in the direction opposite to that of gear 233 and therefore in the same direction as that of the lower order dial transmitting the carry. If gear 228 is moving to introduce digitation, as previously described, ring gear 219 will move by an amount equal to the resultant of that produced by the rotation of gear 228 and that produced by the rotation of gear 233, the movement of the ring gear, of course, being the resultant of the movement of the sun gear and the displacement of planetary centers. Thus the movement of any higher order dial becomes the resultant of the digitation entry into its own order and the carry movement from the next lower order.

The gear ratios are, of course, such that the carry movement received by the higher order dial is one-tenth of that of the lower order dial. A typical arrangement to produce this result is as follows: sun gear 223—ten teeth; planetary gears 240 and 241—fifteen teeth; ring gears 235 and 219—forty teeth; sun gear 233—sixteen teeth; and planetary gears 232—twelve teeth. With this arrangement, one full clockwise turn of a lower order dial rotates sun gear 223 ten teeth, advancing ring gear 235 next to the left ten teeth or one-quarter turn counter-clockwise. This advances sun gear 233 integral therewith one quarter turn or four teeth counter-clockwise which in turn advances ring gear 219 on the higher order assembly four teeth or one-tenth turn clockwise. This carry movement will in turn impart one-hundredth of a turn to the dial next higher than that receiving the original carry movement, one-thousandth of a turn to the dial next higher than that, and so on.

With this gear arrangement, sun gear 233 having four-tenths as many teeth as ring gear 219, one full turn of digitation gear 228 will produce one and four-tenths turns of ring gear 219. Therefore if gear 228 is made a fourteen-tooth gear, each tooth advance of the gear will produce one-tenth of a turn of ring gear 219, or one figure advance of the dial.

In order that this tens-carrying movement may be properly transmitted to all units of the accumulator, it is desirable that digitation gears 228 move only in accordance with values being introduced into the accumulator. To this end means are provided to prevent movement of the gears 228 except as values are being introduced. This means comprises spring pressed pawls 249 (Figure 13) freely mounted on shaft 250, each of which is adapted to engage an associated one of a series of ratchet wheels 215A on shaft 245 and fixed to the gears 215 in each order. As described above, these gears 215 mesh directly with the gears 228 of each accumulator unit and each pawl 249 therefore acts as a brake on one of said gears, being released on actuation, as will presently appear.

Thus, from the foregoing description is is apparent that rotation of a numeral wheel in any order will cause all the numeral wheels in the higher order or to the left thereof to also rotate a certain amount successively either in additive or subtractive direction, depending upon the direction of rotation of gears 228, while in all the orders of a lower value or to the right of the last order in which digitation takes place, no such fractional values are entered.

By virtue of this continuous gearing between the various orders, the dials 222 are advanced so that the numerals are not properly lined up at the sight openings 248, and, in order to overcome this condition, mechanisms have been provided which will turn every numeral wheel to proper alinement with said sight openings directly after an actuation.

The mechanism for attaining this line-up operation of said dials comprises the snail cam 224 secured to the left side of each spider 217 and which cooperates with and serves to position the spring tensioned lever 244 pivoted at 245 (Figure 12). In this figure the snail cam 224 and lever 244 are shown in a position in which the roller 247 on said lever contacts with the high point of said snail cam, which high point represents the zero position of its associated dial wheel 222. The contour of said snail cams is proportioned in such a manner that each higher digit up to nine on the dials is represented by a successive decrease in size of its radius until the lowest point on said cams represents the digit 9 on said numeral wheels; the values increasing on the dials as well as on the cams in clockwise direction, so that for addition the dials and cams are rotated in counter-clockwise direction and for subtraction in clockwise direction when viewing the machine from the right hand side.

When the dipping carriage 214 is in its lowered position, lever 244 is normally rocked and held in a fixed position in which roller 247 is just clear of snail cam 224. Under these conditions, sleeve 237 and stud 239 are held in fixed positions, and each dial is in general advanced to a partial position depending on the digitation it has received and the carry from all orders to the right. For instance, if the resultant value entered is 2,375, the first dial stands between a "2" and a "3" registration, being 0.375 of the way from the "2" to the "3" registration. The next dial stands 0.75 of the way from a "3" to a "4" registration, the next 0.5 of the way from a "7" to an "8" registration, and the next dial squarely at a "5" registration.

When the calculation is completed and the dipping carriage 214 raised, it is desired to back up each dial by the fractional amount it stands ahead of an even registration to secure a clear registration in the sight openings. To this end, each lever 244 is allowed to rock clockwise under the tension of spring 246 as carriage 214 is raised until roller 247 rests against snail cam 224, which, with the cam shaped as already described, allows lever 244 to rock clockwise by an amount proportional to the registration on the dial to which the cam is attached. This rocking of each lever 244 rocks each associated sleeve 237 in a counter-clockwise direction carrying stud 239 forward by an amount proportional to the registration on the dial to the right of it, thus rocking ring gear 235 by a corresponding amount and backing up thereby the next dial to the left by an amount proportional to the registration of the next lower dial, which is the amount by which the dial stood ahead of an even position. The arrangement is therefore such that each increment of carry received from a lower order will be backed out upon completion of the calculation, unless the increment amounts to an entire position, in which case the high portion of the snail cam passing from under the roller prevents such backing out. The result is that when dipping carriage 214 is raised each dial is controlled by the snail cam on the next lower order dial so that the proper figure will be squarely lined up to its sight opening.

Only the dial immediately to the right affects the backing up of a dial and the increment of carry in any one dial is not backed out entirely until that in the one immediately to the right is removed. Thus the task of having the last dial distinguish between two values, as 29,998 and 30,001, is obviated. Thus with 29,998, when the dipping carriage is returned, the "2" dial is not returned until the dials to the right have returned. Then the "2" dial is moved back only 0.9000 of the way and not 0.9998 of the way; the 0.0998 of a turn having been previously backed out.

As previously mentioned, the dials and cams are rotated counter-clockwise for additive and clockwise for subtractive movement while the cam followers 247 follow the snail cams 224 in each order. Now during subtractive operation it sometimes happens that the value subtracted is greater than the value from which it is subtracted. In this case the dials will be rotated clockwise, in the direction from 0 to 9 so that if a zero is standing in any order to the left of the last operating order a 9 will appear. This is because the rollers fall off the high point on the snail cam to a low point, and in so doing back up the dial in the next order one number. If this involves a change from 0 to 9, the change will pass into the next order. Thus a whole series of nines may appear across the carriage to indicate an overdraft. This is termed a "carry-over wave."

The mechanism whereby levers 244 are rocked to remove the rollers 247 from cooperative relation with cams 224 during the performance of calculations will be described hereafter.

The carriage is supported in the machine for transverse shifting in either direction by rollers 280 and 284 on opposite sides of the machine (Fig. 11). The carriage includes track plate 207 sliding between the rollers and hooks 283 on the machine to retain the front of the carriage in place. At the rear of the carriage rollers 284 (Figure 11) engage angle strip 285 on the carriage, the strip sliding between the rollers and hooks 286 to support and retain the rear of the carriage.

Free traversing of the carriage is accomplished by rocking comb 287 (Figures 8 and 9) supported on shaft 213 out of engagement with rollers 288 mounted on the plate 289 secured on shaft 290. A bell crank 291, having a grip portion 291A cooperatively adjacent a fixed grip 291B (Figures 1, 8, and 9) is positioned for rotation on plate 201, with a projection 292, on the other lever arm 296 of the crank, in engagement with a bell crank latch 293 (Figure 9). One end of said bell crank latch is hooked over an extension 294 of the comb 287 which spring 294A normally retains in position against stop 294B. On squeezing together the grips 291A and 291B, the bias of spring 295 on the latch is first overcome and the latch released by projection 292. The end of lever arm 296 continues moving, however, as the grip is advanced, and rocks the comb about shaft 213 and out of engagement with the rollers 288 so that the carriage can be moved freely on the rollers 280 and 284.

Step by step shift of the carriage is effected by rotation of shaft 290, each half turn of the shaft effecting a step of shift. A roller 288 engages a tooth of the comb 287 to advance the carriage an order at a time, as is well known in the art. Rotation of the shaft 290 in either direction is secured as follows.

A manually operable handle 1015 (Figures 1 and 51) is provided at the front of the machine so that the carriage may be manually shifted step by step. The handle is secured to a shaft 1016 which extends rearwardly into the machine, the shaft being biased into a position in which the handle stands vertically by a spring 1017 extending between the side frame of the machine and arm 1018 on shaft 1016. To connect the shaft 1016 to the step by step rotating mechanism a drag link 1019 is extended between these two mechanisms. Drag link 1019 includes a yoke end 1020 which engages roller 1021 on crank arm 1022, the crank arm being oscillatable with shaft 1016. The other end of link 1019 is secured to oscillating plate 1023 which is positioned by pin 1024 between a plate member 1025 and subframe 1101 of the machine. Plate 1025 is supported from the subframe 1101 by spacers 1027 and screws 1028. Plate 1023 carries the two arms 1029 and 1030, the arms extending toward each other and being pulled together by spring 1031 between ears 1045. These arms include noses 1032 which are selectively engaged with projections 1033 on a member 1034 to provide the step by step movement. The gear 1035 is secured to member 1034 and is meshed with gear 1036 which in turn drives gear 1037 in mesh with gear 1038 on shaft 290.

A centralizing cam member 1039 is also provided on shaft 290 so that the shaft is positioned at the end of each half rotation with plate 289 and rollers 288 thereon in a position wherein the rollers engage the comb 287 and lock the carriage in position. A roller 1040, carried intermediate the ends of pivoted lever 1041, engages the centralizing member 1039, and, under the tension of spring 1042 retains the shaft and the rollers 288 supported thereby, in a centralized position.

Plate 1025 includes two cam fingers 1043, while each finger 1029, 1030 includes a camming projection 1044. The utility of these will now be explained. Upon rocking of the handle 1015 to either the right or the left, one of the fingers 1029 or 1030 is rocked into engagement with one of the projections 1033, the notch formed by cam 1044 engaging the projection. Continued rotation of the handle causes the notch to move the engaged projection and thus rotate the gear 1033 and its associated gear train until roller 1040 passes over the centralizing member 1039, when the roller 1040 falls down the centralizing member to centralize shaft 290. The movement of gear 1035 is limited by ears 1045 on each arm, the ear striking one of the spacers 1027 to limit movement. Upon release of the handle, the camming surface 1044 moves its finger outwardly so that it passes over the next projection which has been brought into position and takes up finally a position on the other side of that projection. At the same time the other finger is prevented from causing a shifting in the opposite direction when it is moved back because it has been moved outwardly to pass over the intervening projection 1033 by its upwardly extending projection 1046 being moved outwardly by cam 1043. Eight projections 1033 are provided upon the plate 1034 and the gear train, from 1035 to 1039, is such that the rocking of handle 1015 need be very slight, only 45° in one successfully constructed device, being necessary to move the carriage a step to the left upon counter-clockwise rocking of handle 1015, or a step to the right upon movement of handle 1015 in a clockwise direction.

*Accumulator clearing mechanism*

It will be apparent from the foregoing description that if ring gears 235 be locked against movement while levers 244 are rocked to bring their rollers 247 away from cams 224, then the teeth 243 of levers 244 will act to rock sleeves 237 and arms 238 to rotate planetary pinions 240 and 241 by feeding them over the teeth of locked ring gears 235. If the gears 215 be freed from the braking action of pawls 249, the rotation of planetary pinions 241 thus produced, can, since gears 228 are free to rotate, drive gears 223 to rotate spiders 217 and their attached numeral wheels 222 backwardly, toward the position in which their zero digits align with the sight openings 248. If the rocking be continued until rollers 247 are slightly above the high points of cams 224, the dials will be brought into their zero registration. If a stopping means be placed in the path of lugs 221 carried on said numeral wheels to prevent them from being thus driven beyond zero position, the braking pawls 249 may be restored to operative position, the lock withdrawn from ring gears 235 and levers 244 may be permitted to recede slightly, resting their rollers 247 on the high, or zero, points of cams 224, thus leaving the numeral wheels 222 aligned in zero position.

This mode of operation is used to reset the accumulator to zero, by means of the following mechanism. Mounted upon shaft 255, supported within the rear of plates 214 (Figure 11), are rocking levers 251 connected by a common bail or link 252 which can be engaged and moved counterclockwise by hook 301 on lever 300, in the automatic clearance mechanism presently to be described. Movement of bail 252 moves rocking levers 251 and this movement is transmitted to shaft 250 by the associated lever 254 keyed to said shaft, each lever 254 having a lateral projection 256 thereon which is engaged by nose 257 on associated lever 251 (Figure 11), so that shaft 250 is rotated, as are all levers 254 thereon.

Release of pawls 249 is accomplished by projection 256 on lever 254 engaging extension 258 on pawl 249 (Figure 13) and rocking the pawl 249 against spring 259 which also bears against lever 254. This releases the braking pawls 249 and frees gears 215A.

The dials are returned to zero position by mechanism comprising lateral projections 261 on each lever 254 (Figures 11 and 12) which engage extensions 262 on levers 244 to rock them on shaft 245 against spring 246 and bring the rollers 247 away from cams 224. Teeth 243 on levers 244 act to rock sleeves 237, rocking arms 239 and rotating planetary pinions 240 and 241 by feeding the former over the teeth of locked ring gears 235. Since gears 215A are free to rotate, rotation of planetary pinions 240 and 241 drives gears 223 to rotate spiders 217, and their attached numeral wheels 222, backwardly toward the position in which the zero digits align with sight openings 248.

The discs are restrained when returned to zero positions so as to align their zero digits with the sight openings. Lever 254 has another lateral extension 264 thereon disposed in a cam slot 265 within lever 266 on shaft 245, so that, upon clockwise rocking of lever 254, lever 266 is pulled in a clockwise direction and lateral projections 260 are placed in a dial stop position. The lateral projections 260 are each of a length to engage the zero stop projections 221 (Figure 14) on each dial assembly as well as to engage one of the four projections 236 on the spider 234 and limit the latter against movement past zero position during clearing of the accumulator, thus providing the aforementioned stopping means.

The shaft 250 is biased to rotate in a counterclockwise direction to return the rollers into engagement with the cams. Shaft 250 carries a lever 253 (Figure 9) which is pulled by spring 250A in a clockwise direction so that, when shaft 250 is rocked to clear the dials, the spring is tensioned. As nose of hook 301 is retracted, the spring returns shaft 250 to that position shown in Figure 11, with all the zero numerals on the dials aligned with the sight openings.

*Automatic clearance including motor start and stop*

To clear the previously described accumulator mechanism it is only necessary to rock shaft 250 the requisite amount as has been disclosed. Rocking of shaft 250 can be effected by causing hook 301 on lever 300 to engage and move the bail 252 on the accumulator carriage. The mechanism for manipulating bail 252 by lever 300 from the keyboard of the machine automatically will now be described.

The accumulator clear key 302 (Figure 1), by which the accumulator is cleared, is mounted above the control keys, to be presently described, so as to be convenient to the operator. Stud 303 (Figure 15) in a slot in clear key stem 304 limits downward sliding movement, while the end of key stem 304 is connected to lever 305. Stub shaft 306 supports one end of lever 305 for rocking while the other end of said lever carries a pin 307 which is engaged by bifurcated end of clutch operating lever 308. Shaft 309 provides a support upon which lever 308 can rotate as can clutch dog 310. The clutch operating lever 308 is connected to the clutch dog 310 by screws 311 (Figure 16).

The clutch dog 310 is normally held engaged with the clutch 314, and the key 302 is held in raised position, by spring 312. Clear clutch 314 is not effective until dog 310 is moved rearwardly to cause clutch engagement. The construction of the clear clutch is well known and is that shown in Figure 11 of Friden Patent 1,643,710 to which reference may be had for details thereof.

Upon rearward movement of the clutch dog and resulting engagement of the clear clutch, cam 315 on the driven side of the clutch rocks lever 316, the clutch being driven from the motor through gear 317 (Figure 29). Lever 316 is connected to reciprocating lever 300 by pin 318 so that when cam 315 rocks lever 316 about shaft 309, lever 300 is moved, under the guidance of pin 319 in a slot in lever 300, to the left in Figure 15 to engage bail 252 and clear the accumulator, as previously described. Lever 316, under the tension of coil spring 320 on shaft 309, is urged to return to a position in which hook 301 is spaced from bail 252, and the lower end of the lever 316 is seated and centered in the depressed portion of the cam 315 as appears in Figure 15. Continued depression of the clear key, however, results in continued reciprocation of lever 300 and movement of bail 252 until the key is released whereupon the lever 316 seats in the aforementioned depressed portion of cam 315, although only a single reciprocation of lever 300 is necessary to clear the accumulator mechanism.

The clear key can start and stop the motor by means of the following mechanism. Clutch dog operating lever 308 has a downwardly projecting arm 325 positioned over a lateral shelf 326 on lever 327. Shaft 328 supports lever 327, freely mounted thereon, in a position wherein said lever overlies lateral extension 329 on arm 330. Bell crank 331, supported on shaft 332, connects arm 330 and link 333. Link 333, supported at its rearward end from shaft 335 by link 336, carries an extension 334 of insulating material.

Clear key 302 is only capable of starting the motor when depressed and link 333 is therefore biased to maintain open contacts 337, controlling the motor circuit, by pressing the insulated extension against the rear contact arm. Spring 338, tensioned between bell crank 331 and shaft 335, pulls lever 333 rearwardly and maintains the motor circuit open until overcome by clockwise rocking of bell crank 331 when the motor circuit is closed.

Operation of the motor for at least one clearing operation is secured since with the clearing clutch employed the clutch dog 310 cannot enter the clutch housing and cause disengagement until one clutch revolution is practically complete, as is explained in the aforementioned Friden patent. Contacts 337 cannot be opened therefore, since lever 327 is held depressed by arm 325 on lever 308 which is held depressed by the clutch dog until the clutch housing has made a revolution when, if the clear key is not held down, the clutch dog enters the clutch housing and lever 308 raises to release the contact opening mechanism.

To prevent operation of the clear key when one of the previously mentioned operation control keys is depressed, means are provided for locking out the clear key, upon operation of one of said keys. In the form of machine shown, this interlock comprises arm 339 attached to shaft 328 and rotatable therewith. Upon rotation of shaft 328, as by movement of lever 341 by one of the other automatic control keys to be presently described, arm 342 is rocked and pin 343 in slot 344 in link 330 moves said link to rock bell crank 331 to close contacts 337. Rotation of shaft 328 can only be effected by a control key other than a clear key so that shelf 340 on arm 339 is moved rearwardly by rotation of shaft 328 to abut lever 305 at 345 and prevent depression of the clear key.

Depression of the clear key also locks out the other control keys, shelf 340 coming to a position adjacent lever 305 at 346 and so preventing rocking of shaft 328. Slot 344 and pin 343 permit link 330 to be moved downwardly without moving arm 342 so that the clear key can actuate the clearing mechanism and the motor without disturbing other controls.

Setting clutch

The present machine employs a setting clutch and mechanism driven thereby to effect various machine operations under the power of the motor. In this way the operator is not required to furnish the power requisite to an operation upon and during manipulation of a control key. This improves the accuracy of the operator and quickens operation since the operator is not tired as much as with a machine requiring a high pressure to manipulate a key.

The setting clutch, under the control of the operation control keys of the machine, operates the previously described selection locking gate 197 (Figures 2 and 3) after the sensing system, including feeler arms 181 and 187, have positioned selection plates 155 (Figure 2) in accordance with the setting of cams 146 and 149 by value keys 100, and maintains the plates 155 locked until another operation of the sensing system. Dipping of the accumulator carriage is also under the control of the setting clutch which likewise provides the power to transfer values into the selection mechanism.

The setting clutch is on a shaft 351 which extends across the machine and carries various cam sets for effecting the foregoing operations as well as operating the reverse clutch 411 which is employed in certain presently described operations. The main clutch, controlling power transmission, is also conditioned by the setting clutch, the two clutches being interlocked so that another setting clutch operation cannot be initiated during operation of the main clutch, while the control key remains depressed, as well as excluding depression of another control key until the main clutch completes its predetermined operation cycle. These several features and modes of operations, including structures for attaining them, will now be described.

Structure of setting clutch

The structure of the setting clutch, generally designated 367, and of the roller clutch type, will now be described. Referring to Figures 17 to 20 inclusive, particularly, a roller carrier disc 350 is free on shaft 351 which is driven from the prime mover under control of the clutch. Shaft 351 extends across the machine between the side plates and carries clutch 367 at one end thereof, while other mechanism is mounted upon or driven from the shaft as will presently appear.

An annular gear 351A is mounted on annular flange 352 of disc 350, the disc being driven by the gear, as will presently appear, and the gear being connected to the prime mover through transmission mechanism (see Figure 29). The driven element of the clutch comprises wedge disc 353 keyed to shaft 351. The flange 352 of disc 350 has three apertures spaced equally about its periphery and having rollers 354 therein. Wedge disc 353 has three flats 355 immediately adjacent the three rollers each roller floating between the adjacent flat 355 and the inner periphery of the annular gear 351A and rolling freely when the clutch is not engaged.

In operation, when the clutch is not engaged and the prime mover is in operation, gear 351A is rotated and wedge disc 353 and roller carrier disc 350 are held against rotation by clutch dog 356 (Figures 18, 19, and 22). This dog includes two parallel arms 357 and 358 extending from a common U-shaped hub 359, the dog being generally like main clutch dog 473 as that appears in Figures 21 and 22. The arms are respectively provided with noses 360 and 361, nose 360 engaging one of the teeth 362 on roller carrier disc 350 and nose 361 engaging one of notches 363 in disc 353, a notch being employed to prevent rebound.

In machines of the charcter herein considered, speed in operation is important and it is desirable that the clutch engage and transmit power to shaft 351 immediately upon operation of the arms 357 and 358 to release discs 350 and 353. Provision for friction between flange 352 on roller carrier disc 350 and gear 351A is made so that rollers 354 jam instantly and full power is transmitted through the clutch. In Figures 18 and 20 I have shown flange 352 of roller carrier disc 350 provided with three receptacles 364 equally spaced about the flange and having therein metal cups 365 pressed against gear 351A by springs 366. The drag provided on gear 351A by the spring pressed cups in flange 352 causes the rollers to jam quickly and effectively when discs 350 and 353 are released.

It is to be noted that the described clutch 367 is normally capable of only half a revolution; that is, if clutch dog 356 is raised, even for an instant, and then released, the clutch and shaft 351 will make half a revolution before the noses 360 and 361 can again engage their respective notches or teeth 362 and 363 to open the clutch, stop, and lock the mechanism. A uni-cycle operation is thus secured and is utilized to actuate mechanism hereinafter described.

Declutching is effected as follows:

When the clutch engages in the manner previously described, the roller carrier rides a certain angular distance in advance of the driven side of the clutch. When a cycle is approximately completed, therefore, this roller carrier engages nose 360 of clutch dog 356 before the driven side engages nose 361 and definitely blocks any further progress of the roller carrier. The action of inertia of the moving parts and any further driving tendency of the clutch serves to advance the driven side from this position, the advance immediately breaking the wedging effect of rollers 354 and declutching the driven side. However, the driven side advances a slight angular distance, due to ineritia, and allows the nose 361 to drop into a notch 363 on the driven side 353, the notch retaining the driven side against rebound and definitely locking it in its full cycle position.

Setting clutch control

Operation of the setting or auxiliary clutch 367 is under the control of the machine operator, particularly through the instrumentality of various operation control keys presently described. The control of the clutch 367 is such that, immediately upon depression of one of said keys, the clutch is engaged, clutch dog 356 being raised to release the clutch and cause engagement thereof to drive shaft 351.

The mechanism for securing this control includes (Figure 22) clutch dog 356 pivoted on shaft 370 and engaging the clutch 367 as previously described. Spring 371 urges the clutch dog into engagement with the clutch, the spring engaging lateral extension 372 (Figure 22) on the clutch dog. Tension of the spring is overcome by bell crank 373 having a hooked arm 374 thereon to engage lateral extension 372 on the clutch dog. The other arm 375 of the bell crank is pulled toward bar 376 by tension spring 377 while the bell crank is hinged by pin 378 on member 379. Member 379 is supported for rotation by pin 380 and connected by pin 381 to bar 376.

To provide for operation of the setting clutch, by any one of the control mechanisms, as presently described, bar 376 is made common to them and is adapted to be directly or indirectly actuated by them. Bar 376 is supported on plate 483 (Figure 28) and hinged to lever 383 which is urged to maintain bar 376 in the raised position shown in Figure 22 by tension spring 384 pulling on an end of lever 383 and on the opposite side of the hinge point 385 of lever 383. Downward movement of bar 376 results in hooked arm 374 engaging and releasing clutch dog 356 so that the setting clutch is free to rotate shaft 351.

To secure uni-cycle operation of the setting clutch 367, since this is all that is required to operate the mechanisms actuated or controlled by clutch 367, even though the control key initiating operation of the clutch 367 is in depressed position, means are provided for returning the clutch dog 356 to cause disengagement of the clutch after half a revolution of the clutch and shaft 351. This includes releasing the clutch dog 356 from hooked arm 374 so that the spring 371 biases the clutch dog to contact the clutch 367, particularly one of the teeth 362 and one of the notches 363.

The mechanism for securing this mode of operation includes the complementary reverse cams 386 and 387 (Figure 25) to be presently described in connection with certain automatic functions. These cams are respectively engaged by cam followers 388 and 389 on rocking lever 390. Said lever is pivoted at 391 on the frame and lies partly between cams 386 and 387. The rock lever 390 is connected to an arm 393 which is supported for reciprocation by pin 394 in slot 395. The arm 393 includes a lateral projection 396 at its forward end which engages hooked arm 374 and pushes said arm against the tension of spring 377 about pin 378 to release the lateral projection 372 of the clutch dog 356.

Immediately upon operation of clutch dog 356 by link 374, engagement of clutch 367 ensues and shaft 351 is rotated. Cams 386 and 387 thereupon rotate and move arm 393 to engage hooked arm 374 and release the clutch dog 356 which, under the tension of spring 371, is urged to stop the clutch 367 and the shaft 351 upon completing half a revolution.

Selection lock

The setting clutch 367 is effective to operate the previously described locking gate 197 (Figures 2 and 3) which is pivoted to the frame of the machine at 198 and adapted to engage one of the three notches 199 in each selection plate 155 to hold said plate against movement in either direction. The selection mechanism is thus locked after selection has been made, under the control of keys 100, in each order of the machine, and the sensing system has operated.

The timing of release and locking of selection plates 155 is such that at the beginning of the uni-cycle operation of setting clutch 367, all the plates 155 are released to permit setting by the sensing system including feeler arms 181 and 187 as previously described. The moment setting is accomplished, due to rotation of shaft 351 and cams 190 and 191 thereon, the locking gate 197 is immediately positioned to lock the plates in the selected position until beginning of the next uni-cycle setting clutch operation.

The lock gate is moved into position to engage one of the three notches 199 by links 400 (Figure 3) which extend at opposite ends of gate 197 to the rock levers 401 pivoted on shaft 195 and carrying cam followers 402 and 403 which respectively are in engagement with complementary cams 404 and 405 to secure the requisite movement of lock gate 197 at the correct cyclic position since the lock gate operates both before and after the previously described sensing system has operated. The cams 404 and 405 constitute a pair, one such pair being mounted upon shaft 351 at the ends of the locking gate. Since the setting clutch controls rotation of the shaft 351, the proper sequence of operation is served, cams 404 and 405 being suitably contoured to this end.

Selection sensing

Operation of the sensing system, which, as previously described, comprises (Figure 2) feeler arms 181 and 187 and selection plates 155 positioned by said arms in accordance with the sensing of cams 146 by feeler arm sensing noses respectively 183 and 189, is effected by complementary cams 190 and 191 on shaft 351.

The setting clutch 367, immediately upon release, is effective to rotate shaft 351 through half a revolution and release the locking gate 197 for sensing plates 155. Cams 190 and 191 (Figure 2) thereupon operate upon cam followers 192 and 193 and their rock lever 194 to move link 196 and actuate the feeler arms to sense cams 146 and position selection plates 155 in one of the three possible positions in accordance with the sensing of said cams. The cams 190 and 191 then move the cam followers and their cooperative mechanism to release the feelers from sensing cams 146, but only after locking gate 197 has been moved into position by cams 404 and 405 (Figure 3), to retain the sensing plates 155 against displacement until immediately following the beginning of another setting clutch cycle.

Control of main reverse unit

In some machine operations it is desirable to reverse the direction of rotation of certain mechanism, particularly in those performed under the control of minus bar 410. Means are therefore provided (Figure 25) which condition the main drive, upon depression of the minus bar, automatically under the control of and by the setting clutch 367. These include a reverse clutch 411 actuated upon uni-cycle operation of the setting clutch.

Minus bar 410 is mounted on stem 412 which is supported for sliding movement by pins 413 and spring 414 extending between stem extension 415 and one of pins 413. The extension 415 overlies a rearwardly extending projection 416 on pendular lever 417 hinged on stub shaft 418. A reverse operating bar 419 is hinged on lever 417 and upon a link 420 which extends upwardly from rocking lever 390 (Figure 25). The reverse bar 419 extends beneath reverse control unit 421 which is hinged at 422. Whenever shaft 351 is rotated by the setting clutch, cams 386 and 387 are rotated and reverse bar 419 is raised to bring face 423 into contact with one or the other of cross-ties 424 and 425 (Figure 37) on the reverse control unit 421.

The reverse control unit 421 includes a plate 426 containing a radial slot 427 through which shaft 428 extends. A spring pressed pawl 429 is hinged on the plate to centralize the control unit on one side or the other of shaft 428, depending on movement of reverse bar 419. Then, with the minus bar in raised position, under the tension of spring 430 as shown in Figure 25, shelf 423 will be raised by cams 386 and 387, upon rotation of the setting clutch 367 and shaft 351, to engage cross-tie 424. The reverse clutch is thereupon conditioned by control unit 421 to drive the calculating mechanism in the plus direction.

If the minus key is depressed, reverse bar 419 is drawn forward and shelf 423 is placed beneath cross-tie 425 so that, when the cams 386 and 387 are rotated, the reverse control unit 421 conditions reverse clutch 411 to drive the calculating mechanism in the minus direction. The centralizing pawl 429 retains the control unit 421 in position according to the movement and setting of reverse bar 419. When the minus key is released, the bar automatically returns to position to contact extension 424 upon the next operation of shaft 351 and raising of the reverse bar, if the minus key is not then depressed.

Carriage dipping

After selection has been made of the values to be entered into the machine and operation of the sensing system has occurred, which includes the previously described release by and under the control of the setting clutch 367 of selection plates 155 by lock gate 197, the sensing in each order of the machine of cams 146 by noses 183 and 189 on feeler arms 181 and 187, and the movement of the selection plates in each order to position its gear 157 followed by the locking of the selection plates, entrance of the values into the accumulator is made so that the values appear on the dial faces 222 in alignment with sight openings 248. As previously described, the accumulator includes (Figures 11, 12, 13, and 26) a series of plates 214 connected by a common bail 214A and supported for a dipping movement by shaft 213. After selection, plates 214 are rocked about shaft 213 to bring gear 215 in each order into contact with intermediate gear 166 (Figure 6) keyed to sleeve 153 together with gears 154, 160, and 163. This group of gears 154, 160, 163, and 166, being keyed to a common sleeve in each order, are rotated as a body at a certain speed and for a certain distance according to the value selected as has been described in connection with Figures 2, 6, and 7A to 7E inclusive. Dipping of the carriage also results in the release of gears 215 from the braking action pawls 249, each pawl being carried down into engagement with shaft 249A whereby the pawls are rocked clockwise to release gears 215.

Meshing of gear 215 with intermediate gear 166, in each order results in the selected value being placed in the accumulator by rotation of dials 222. To secure dipping of the carriage at the correct cyclic time, means are provided under the control of the setting clutch and operated thereby for dipping the carriage and transferring the value selected.

The means for momentarily lowering the carriage, from that position in which it appears in Figures 2, 11, 12, 13, and 26, to bring gears 215 into mesh with gears 166 and then elevate the carriage at completion of the calculation, comprise two vertical sliding link assemblies 440 (Figure 26) positioned on opposite sides of the machine. Each assembly includes two members 441 and 442 slidably connected by pins 443, 444 and slots 445 and 446. Pin 443 is fastened to the frame of the machine and guides the assembly in its movement. An expansion spring 447 urges the members 441 and 442 to contracted position.

Member 441 includes a hook 448 engaging bail 214A while member 442 is hinged to cam lever 449 which is rocked on shaft 450 by cam follower 451 in engagement with cam 452. Tension spring 453 biases the assembly vertically, the spring being positioned between fixed pin 443 and the connection of member 442 to cam lever 449 so as to urge cam follower 451 to engage cam 452 secured on shaft 351.

Means are provided for maintaining the carriage in raised position when the machine is not in use or during shifting or clearing operations, and for maintaining the carriage in its lower position during engagement of gears 215 and 166. This means includes a latch lever 454 hinged at 455 and having a nose 456 formed at the upper end thereof to engage the lower edge of lateral extension 457 on member 442. The latch lever is urged to engage the extension 457 by spring 458 which pulls on link 459 to which the latch lever is hinged at 460. This latch is effective to maintain the carriage in either its raised or lowered position during those periods when the setting clutch 367 is not operating.

To disengage the latch lever 454 and permit lowering of the carriage upon beginning of a setting clutch operation, as well as to latch the carriage in its lower position, means are provided to move link 459 and so rock lever 454 out of engagement with the lower face of extension 457, and into engagement with the upper face thereof, recess 456A being hooked over the extension. A lever 461, lying partly between cams 386 and 387 (Figure 25) and engaged by rock lever 390, is secured to shaft 463. Rocking of plate 390 by reverse cams 386 and 387 also rocks shaft 463, to which rocking arm 462 is attached (Figure 26). The latch 454 is first released, cam 452 then lowering the carriage. The downward movement of the carriage is limited by tooth 466 engaging adjustable resilient stop 467. The assembly 440 is usually proportioned so that spring 447 is compressed and the members 441 and 442 are extended when the carriage is lowered so that the carriage, when released, returns quickly. The nose 456 of latch lever 454 is formed with a recess 456A to hook over the upper side of extension 457 so that, when the carriage is lowered, it is latched down with gears 215 and 166 in mesh.

Means are provided for latching the carriage in lowered position throughout the period of operation of the main clutch, and for returning it to raised position, where it is also latched, upon termination of such main clutch operation. The controls for the latching means are such that the latch is operative to hold the carriage depressed only during main clutch cycles which follow a setting clutch cycle during which the carriage is lowered. On completion of the last main clutch cycle the latch is released to allow the carriage to be raised, and at all other times the carriage is latched in its raised position.

Latches 454 (Figure 26) pivotally mounted at 455 are provided with upper notches 456B and lower notches 456A either of which may engage lugs 457 on the carriage dipping link assemblies 440. Each of the latches 454 is connected to a rock shaft 463 by a link 459 pivotally connected to an arm 462 fixed to the shaft, and a spring 458 tensioned between link 459 and the machine frame tends to maintain the latch members 454 in engagement with lugs 457, and rock the shaft 463 clockwise. However, each notch 456A is offset from notch 456B so that when lugs 457 are lowered to a position where they may be engaged by the former, spring 458 will rock shaft 463 farther in a clockwise direction than when the lugs 457 are in the position illustrated in Figure 26.

The devices for releasing the latches to permit the carriage to move from lowered to raised position comprise, as shown in Figure 27, a ratchet wheel 475 carried directly on the motor shaft and adapted to be engaged by a hooked finger 477 on bellcrank 469 pivotally mounted on an arm 468 attached to shaft 463 to effect counterclockwise rocking movement of said shaft and thus to rock latches 454 (Figure 26) out of engagement with lugs 457. Spring 470 (Figure 27) tensioned between one arm of the bellcrank 469 and the arm 468 tends to move the finger 477 into engagement with the ratchet 475.

When the carriage is in lowered position and the main clutch is operating, the main clutch control dog 473 is rocked clockwise from the position in which it is shown in Figure 27 and the turned end 471 of an arm 472 integral with said dog engages an extension 476 of the bellcrank 469, rocking the latter about its pivot on arm 468, against the tension of spring 470 to prevent the finger 477 from engaging ratchet 475.

As dog 473 rocks counterclockwise to effect disengagement of the clutch, however, the recession of arm 472 permits spring 470 to move finger 477 into the path of movement of the teeth of ratchet 475, which will be rotating due to coasting of the motor even though the motor control circuit is opened. The impact of a tooth of ratchet 475 against finger 477 kicks bellcrank 469 to the left, as viewed in Figure 27, rocking shaft 463 counterclockwise and rocking latches 454 (Figure 26) to disengage notches 456A from lugs 457.

As the carriage is moved upwardlly by spring 453 lugs 457 engage cam surfaces lying between notches 456B and 456A on latches 454 to rock said latches still further in the clockwise direction, and to simultaneously rock shaft 463 to carry the finger 477 (Figure 27) of bellcrank 469 leftwardly out of the path of movement of the teeth of ratchet 475. When the carriage reaches its upper position, lugs 457 (Figure 26) engage in notches 456B so that the carriage is latched in said position, and finger 477 (Figure 27) is maintained in the position shown, in which it has been moved to a leftward position out of engagement with ratchet 475 and cannot engage the same, irrespective of the positioning of the arm 472 control by the main clutch dog.

It should also be noted that the dipping of the carriage will remove the bail 252 from operative juxtaposition with the clearance operating link 300 (Figure 11), thus rendering an interlock between the main clutch and clear clutch unnecessary.

Main clutch opening

The main clutch is closed and its operation initiated under the control of the setting clutch. Thus, when any one of the operation control keys is depressed, and the setting clutch started in operation, as has been previously described, the main clutch is automatically engaged, upon operation of the setting clutch for one or more cycles of operation, depending on the operation called for by the key depressed.

The main clutch structure is the same as that of the setting clutch, being of the roller clutch type as disclosed in connection with Figures 17 to 20 inclusive. The main clutch 480 (Figures 22, 27, and 28) is mounted on shaft 481 positioned between frame plates of the machine (Figure 32). The clutch is controlled by clutch dog 473 (Figure 21) the details of which have been disclosed in connection with the setting clutch 367 and its control clutch dog 356. Main clutch dog 473 is mounted on stub shaft 474 carried by bracket 482 supported on the control plates of the machine. The clutch dog 473 is urged into engagement with the main clutch by spring 484 positioned between plate 483 and lateral extension 485 of the clutch dog.

A rocking lever 486 is rotatable on shaft 370 and carries cam follower 487 in engagement with the cam 489 carried by the setting clutch shaft 351 (Figure 28). The rocking lever carries a lateral projection 491 which contacts with face 488 on clutch dog 473 and serves to disengage said dog upon rotation of setting clutch shaft 351. Cam 489 rocks lever 486 counter-clockwise so that projection 491 bears against face 488 on the clutch dog 473 to release the dog and cause engagement of the main clutch 480. Further rotation of cam 489 permits return of the rocking lever to the position shown in Figure 28 and clutch dog 473 to engage and stop the clutch when freed from the holding means hereinafter described.

Interlock between main and auxiliary clutches

To prevent another setting clutch operation from being initiated by depression of a control key before the main clutch has completed its last predetermined operation and has come to a full stop, means are provided for preventing actuation of the setting clutch during operation of the main clutch. This means is in the form of an interlock which, as is shown in Figures 22, 23, and 24, includes rocking plate 492 mounted on shaft 370 and carrying pivoted thereon latching arm 493 (Figure 23). Spring 494 pulls arm 493 toward plate 492 relatively in a clockwise direction and tends to maintain projection 495, on arm 493, against the plate so that the two move as a unit in clockwise direction, but form a yieldable latch in counter-clockwise direction.

The plate 492 is connected by a link 496 to the main clutch dog 473 so that when the main clutch is opened and dog 473 is rocked, as upon rotation of the setting clutch shaft 351 under the initiation and control of a control key, plate 492 and arm 493 are rocked. As disclosed in connection with control of the setting clutch, bar 376 is depressed by any of the control keys. As plate 492 and arm 493 are rotated in a clockwise direction by link 496 upon clutch engaging movement of clutch dog 473, arm 493 strikes and is held by projection 497, while the plate 492 continues its rotation. The arm continues in this position until the depressed key is released and bar 376 is raised by spring 384 when the arm, under the tension of spring 494, is released and immediately passes on in its interrupted journey to come to rest with projection 495 against plate 492 and shoulder 498 beneath projection 497. In this position, spring 494 maintains latch lever 493 as means preventing depression of bar 376 by any of the operation control keys. The main clutch is thus free of interruption by intentional or inadvertent depression of another control key during its predetermined cycle of operation.

Stopping of the main clutch includes counterclockwise rotation of the clutch dog 473 and consequent counterclockwise rotation of plate 492 and arm 493 to return to the position shown in Figure 22 wherein the mechanism is shown free of the interlock and capable of carrying out any single selective operation upon depression of bar 376.

Circuit closing and operation of the contacts 337 to control the motor has been described under the clearing of the carriage. Means are also provided for controlling the motor circuit by the operation control keys and for locking the circuit closed until the main clutch has completed its predetermined operation cycle.

These means include lever 341 having arms 342, 499, and 500 (Figures 15 and 28). Arms 499 and 500 have projections 501 and 502 adjacent respectively to main clutch dog 473 and setting clutch dog 356, the lever 341 lying between the two dogs so that, as setting clutch dog 356 is disengaged with the setting clutch 367, it rocks lever 341 clockwise. As previously described, lever 341 includes arm 342 which carries pin 343 in slot 344 in link 330. Rocking of lever 341 is therefore effective to move link 330 and close contacts 337.

Upon subsequent rocking of main clutch dog 473, projection 501 on arm 499 is engaged and the circuit maintained closed during the main clutch operation cycle, as determined by the depressed operation control key, although the setting clutch dog returns to clutch stopping position. When main clutch dog 473 returns to clutch stopping position, spring 338 returns the lever 341 to that position in which the circuit is open.

Movement of lever 341 by one of the operation control keys also locks out the clear key as previously described, shelf 340 on arm 339 on shaft 328 engaging lever 305 at 345 to prevent depression of the clear key 302.

General calculations drive

Power for the various operations of the machine is supplied, under the control of the various control keys of the machine, through the main clutch 480, the setting clutch 367, the accumulator clear clutch 314, and the presently described counter clear clutch 521. To drive these units, a motor 522 is mounted within the frame of the machine and its speed regulated by a speed governing device 523 which includes a knurled knob 523A for enabling the machine operator to vary the motor speed from outside the machine casing. A flexible coupling 524 connects the motor shaft 525 to an overload release device as adjustable slip clutch 526. Any well known form of slip clutch may be used. A pinion 527, driven by the slip clutch, drives the main clutch 480 through a transmission system including gear 528 on shaft 529 carrying gear 530 meshed with gear 533 on shaft 532 which is engaged with gear 534 on shaft 535 which in turn engages and drives the gear on the main clutch. The main clutch 480, when engaged, results in selective directional driving of the half speed shaft 150 (Figures 2 and 31) and quarter speed shaft 151 under the control of reverse unit 411 which determines initial power application to either gears 536 and 540 or to gear 586. Thus, as will appear under the reverse unit, gears 536 and 537, driven by main clutch 480, are driven through division drive unit, presently described, and main reverse unit, to drive shafts 150 and 151, or gear 586 can be so connected to drive gear 585 on shaft 584 carrying gear 538 in the gear train connecting the two shafts and including gears 539 and 544 on said shafts and other gears 538, 537, and 536, as well as gears 543, 542, 544, and 540.

The setting clutch gear 351A is driven by gear 531 connected by hollow sleeve 532 to gear 533 of the main clutch train.

Plus bar mechanism and operation

The plus bar 550 for controlling initiation of the motor, as well as operation of the setting clutch and main clutch, is positioned on the right hand side of the keyboard as appears in Figure 1. The bar is mounted by a frame 551 (Figure 30) on two similar bell cranks 552. The bell cranks are supported on right frame plate 483 and are connected by link 553 so as to provide a parallel link support for the plus bar. Spring 554 urges the plus bar toward an upright position in which extension 555 on frame 551 engages the under side of the keyboard cover of the machine to limit upward movement of the plus bar.

The plus bar is capable of initiating operation of the motor, the setting clutch 367 and the main clutch 480, and the functions and operations controlled by said clutches. As previously explained, depression of bar 376 is followed by closing of contacts 337 (Figure 28) and operation of the setting clutch 367 and main clutch 480. To depress the bar 376, which is common to all operation control keys, extension 556 is provided on frame 551 so that depression of the plus bar rocks the bar 376 which thereafter closes the motor circuit and causes engagement of the setting clutch and main clutch as previously described.

Depression of the plus bar then initiates operation of the motor, operation of the setting clutch and operation of the main clutch to drive the quarter and half speed shafts. So long as the plus bar is held depressed, the value set up in the keyboard will be added into the accumulator. Thus, multiplication is performed, the product being found in the accumulator, the multiplicand on the keyboard and the multiplier in the presently described counter register, including dials 900, observable through sight openings 901 (Figure 1), which counts the number of cycles of operation of the accumulator.

Main clutch dog latch

Depression of the plus bar is normally utilized to secure several repeat operations. To this end, means are provided for maintaining the main clutch engaged until the plus bar 550 is released by the operator. In Figure 30 this means is shown as including three levers 560, 561, and 562 pinned to shaft 563 and biased to move in a clockwise direction by spring 564 pulling on lever 560. When the machine is at rest and bar 376 is in raised position, arm 561 is held by projection 497 on bar 376.

Downward and rearward movement of bar 376, as by the depression of the plus bar, results in lever 561 rocking rearwardly and shaft 563 is rotated, by the tension of spring 564 on lever 560, until lever 562 engages lateral projection 485 (Figures 22, 28, and 30) on the main clutch dog 473 and latches the main clutch dog out of engagement with its clutch. The main clutch is thus operatively closed and engaged to drive as long as the plus bar is held depressed. Upon release of the plus bar, spring 384 returns bar 376 and pulls lever 561 in a counter-clockwise direction. Shaft 563 is thus rotated and lever 562 rocked to release the extension 485 of the main clutch dog which engages, stops and opens the clutch.

Main reverse unit

The plus bar, under control of the operator, effects one or more operations of the operating elements. The minus bar effects one or more operations of the operating elements in the opposite direction and therefore controls not only initiation of operation of the motor and operation of the setting and main clutches, but also suitable mechanism for reversing the direction of drive of the operating elements, particularly the direction of rotation of the half and quarter speed shafts 150 and 151, as well as the drive to the presently described counter actuator. This mechanism includes the main reverse unit 411 (Figures 25, and 32 to 37 inclusive). This unit is mounted on the fixed main clutch shaft 481, is driven through the division drive unit including internal gear 570 (Figure 32) rigidly fastened to plate 783 which is secured to the driven side of the main clutch 480 and drives three planet gears 571 on planet plate 572. The planet plate is keyed to one end of sleeve 573, supported on shaft 481, while a second planet plate 574 is keyed to the other end of the sleeve. The second plate also carries three planet gears 575 and these drive internal gear 576 secured to disc 577, the disc being keyed to the reverse clutch unit 411. Planet gears 571 and 575 are respectively in mesh with sun gears 578 and 579. These sun gears are held against rotation except during division, as will appear presently under "Division mechanism", so that the planet gears 571 rotate about their own axes as well as about shaft 481 when the main clutch rotates. Planet plate 572 is then rotated and, since this plate is keyed to the sleeve 573, both the sleeve 573 and the other planet plate 574 are rotated. This rotation is transmitted to the internal gear 576 secured to disc 577 and the reverse clutch unit 411 so that the reverse unit 411 is rotated with the main clutch.

The unit 411 includes a clutch plate 580 integral with sleeve 581 (Figures 32, 35, and 36) which is keyed to disc 577 and rotates on the fixed shaft 481. Ratchet discs 582 and 583 are positioned on sleeve 581 on opposite sides of plate 580. Ratchet disc 582 has rigidly secured thereto gears 536 and 540, while ratchet disc 583 has a gear 586 affixed thereto.

Driving connection between clutch plate 580, rotated by the main clutch, and gears 536 and 540 or gear 586, to effect rotation in opposite directions, is secured selectively. Clutch plate 580 includes three arms 587, 588, and 589. Hinged on arm 587 is a two-armed ratchet dog 590 having radially shaped feet 592 and 593 on opposite sides and at the end of each arm thereof (Figures 34 and 35). These feet are cooperatively positioned with respect to notches 591 and 594 respectively in the ratchet discs 582 and 583 (Figure 36). When foot 593 is in engagement with notch 594 in ratchet disc 583, a driving connection is established between plate 580 and disc 583 while if foot 592 is engaged with the notch 591 in ratchet disc 582, a driving connection is established between plate 580 and disc 582 since ratchet dog 590 is secured to plate 580.

Selective engagement of notches 591 and 594 by the ratchet dog 590 is secured by reverse control unit 421 (Figure 25) engaging bell crank 596 or dog 590 (Figures 25 and 34). Bell crank 596 is hinged on arm 589 of the plate 580 and is secured to dog 590 by link 597 connected to one arm of the bell crank 596. The other arm of the dog 590 engages pawl 598 (Figure 25) which is hinged on arm 588 of plate 580. Pawl 598 is urged in a clockwise direction by spring 599 positioned between plate 580 and one end of the pawl. The other end of the pawl overlies the end of dog 590 when the unit is in the position shown in Figure 25 with foot 592 in notch 591. When the unit is in the opposite position and foot 593 is in notch 594, end portion 600 of the pawl 598 abuts face 601 on the dog to lock the dog 590, the tension of spring 599 being sufficient to maintain the dog in either of the two ratchet disc engaging positions.

Since the reverse clutch unit 411 rotates with the main clutch, it will always stop with either the ratchet dog 590 or bell crank 596 over the control unit 421. The arms of both the dog and the bell crank are formed to cooperate with offset plates 602 and 603 (Figure 37) of the control plate 426, said arms carrying projections or integral lugs 604 (Figure 34) to engage the offset plates (Figures 32 and 37).

The unit described provides a connection between main clutch and the half and quarter speed shafts 150 and 151 (Figure 31). Thus, if gears 536 and 540 are driven by plate 580, movement will be transmitted to drive the half speed shaft through a gear train including gears 536, 537, 538, and 539 and the quarter speed shaft through a train including gears 540, 541, 542, 543, and 544. When gear 586 is driven by plate 580, the quarter and half speed shafts are driven in the opposite direction from gear 585 directly in mesh with gear 586 instead of through idler 537.

Minus bar operation

The minus bar 410 is shown in detail in Figures 25, 38, and 39 and has been previously described in connection with control of the reverse unit 411. Initiation of motor operation and opening of the setting clutch is also under the control of the minus bar, the stem 412 thereof including a shelf 615 thereon (Figures 25 and 38). The rounded ends of two latch levers 616 and 617 are supported by this shelf (Figure 38). Tension springs 618 and 619 urge these levers in a clockwise direction about their common supporting stud 620 on the right control plate 483 and into engagement with the shelf 615. Latch lever 616 may retain rocking lever 622 while latch lever 617 may retain rocking lever 623 during minus bar operation as hereinafter described, latch lever 622 being rotatable on shaft 624 while rocking lever 623 is fixed thereon (Figures 38 and 39). Spring 625 urges lever 623 into engagement with lateral extension 627 on lever 622, the spring being positioned between levers 622 and 623 on the other side of shaft 624. Another spring 628, positioned between the extremity of lever 622 and the plate 483, urges levers 622 and 623 in a clockwise direction. When the minus bar is depressed and shelf 615 moved out of engagement with lever 622, levers 616 and 617 are respectively pulled downwardly by springs 618 and 619 and levers 622 and 623 are rocked by said spring 628 until lever 622 overlies the shelf 615, while extension 629 on lever 623 engages recess 630 in lever 616 to retain lever 623 until the minus bar is released by the operator.

Movement of the minus bar downwardly is effective to start the motor and open the setting clutch. As before mentioned, lever 623 is keyed to shaft 624 so that when the lever is rocked rearwardly by spring 628, upon depression of the minus bar, the shaft 624 rotates. A bell crank 632 (Figure 39) is secured to the shaft and to a link 633, extending to the end of lever 383 (Figures 28 and 39). Rotation of shaft 624 is effective to rock lever 383 in a clockwise direction and bar 376 rearwardly to release the setting clutch dog 356 and close the motor circuit, as has been previously disclosed. The link 633 is slotted at 634 to permit movement of bar 376 as by the plus key, when the minus key is in inactive position, to actuate the setting clutch and start the motor.

It is a feature of the described mechanism that the minus bar is utilized only to release stored energy which actuates the mechanism controlling initiation of motor operation and the release of the setting clutch. This results in only a light touch being required on the minus bar with consequent reduction in strain on the operator. The spring 628 biasing link 633 is provided of a size to have strength enough to move bar 376, and its cooperatively associated mechanism, to start the motor and cause engagement of the setting clutch.

A further feature is the retensioning of spring 628 by the motor rather than by manual effort of the operator so that energy stored in the spring is replenished automatically. This is secured by restore member 635 which is free on shaft 624 and is connected by link 636 to arm 637 secured on shaft 638 supported in right and left hand plates 483 and 621.

Mounted on the main clutch shaft is a cam 639 engaged by cam follower 640. Rock plate 641 carries this follower, the plate being supported on shaft 474. The plate carries a pin 642 engaged by bifurcated arms 643 of a two-armed lever secured to shaft 638. The cam rocks the lever 637 and its link 636 as soon as the main clutch starts to rotate. This rocking occurs against the tension of spring 644 on the other arm 645 of said two-armed lever which is secured to shaft 638.

Movement of the bell crank rocks member 635 and restores lever 622, moving said lever counter-clockwise from its position over the shelf 615, so that the minus key can return quickly when released. This rocking of lever 622 also retensions the spring 628 and preserves it in this condition until the minus bar is again depressed. The restore member 635 engages a projection 646 on the lever 622 and rocks said lever counter-clockwise upon movement of link 636 by the cam on the main clutch shaft. When the lever 622 is rocked, extension 627 thereon is engaged by nose 626 on latch 616 to retain the lever and tension spring 628. Upon release of the minus bar by the operator, the spring 628 is in condition to supply energy for initiating another machine operation upon another minus bar depression.

The minus bar is employed in subtraction operations, as to perform a negative multiplication, the value in the keyboard being subtracted from that in the accumulator through reverse operation of the quarter and half speed shafts.

When the minus bar is released, latch 617 is raised by shelf 615 to release member 623 and allow it to return in a counter-clockwise direction under the tension of spring 625. This allows operating bar 376 to return upward and trip off latch 562 to stop the main clutch. Latch 616 is also raised off after shelf 615 rises in back of member 622, thus releasing member 622 from projection 626 and allowing member 622 to fall back against shelf 615 so that, upon the next depression of the minus bar, member 622 is free to respond to the urge of spring 628 and move rearwardly over said shelf 615.

*Pulsating mechanism*

The machine of the present invention includes actuating and accumulator mechanism which rotate continuously during each cycle of operation of the main clutch, except in division. This enables the machine to be operated at a much higher speed and eliminates that cyclic noise, therefore, characterizing such a machine as that of the Friden patent before mentioned. The operator cannot, therefore, utilize and depend on this cyclic noise in the present machine to count machine cycles. To replace this cyclic noise in this fast, quiet running machine and to speed up machine operations and facilitate the handling of problems thereon, the plus bar 550 and minus bar 410 are rocked or pulsed by each machine operation during that period when either of said bars is held depressed. The rocking of member 635 (Figure 39) by link 636 and cam 639 on the main clutch shaft has previously been described (Figures 30 and 38). To pulse the control bars, connection with the transverse portion 648 of member 635 is made upon depression of either bar. Thus, an extension 649 is provided on plus bar frame 551 (Figure 30) with a flat 650 overlying the said transverse portion. Minus bar stem 412 has an extension 651 thereon which can engage said transverse portion 648 (Figures 25 and 39).

Upon depression of the plus bar, flat 650 can be engaged by the transverse portion of the member 635 and slightly raised thereby upon each half rotation of the main clutch, corresponding to a machine cycle. Similarly, the minus bar stem extension 651 can be engaged by the member 635 and raised thereby slightly when that bar is depressed, upon each machine cycle. The machine operator can thus sense the number of machine operations and does not have to observe the counter mechanism to count machine cycles.

*Add bar mechanism and operation*

The add key 660 (Figure 40) is employed to effect a single cycle of operation and clear the keyboard. Thus, the add bar, when depressed, initiates a motor operation, opening of the setting clutch, a single main clutch cycle, clearing of the keyboard, and an opening of the motor circuit. This manner of operation is that employed when different values are to be inserted in the machine as in addition operations. The mechanism for securing this mode of operation will now be described.

The add key is carried on a stem 661 which is supported from the left hand supporting plate by two parallel links 662 and 663. A pin 664 on the end of the stem 661 is positioned within a slot 665 in bar 666. The forward end of the bar is bifurcated and engages a pin 667, the pin being carried by gale 111 employed in clearing the entire keyboard as has been described in connection with Figure 2. A tension spring 668 positioned between the bar and the supporting plate, maintains the add key in raised position.

Downward movement of the add key actuates the previously described mechanism for initiating operation of the motor and causing engagement of the setting clutch. Thus, the add key is effective to rock bar 376 rearwardly (Figures 22 and 28) so that the setting clutch dog 356 is raised and engagement of the setting clutch results, while contacts 337 are closed and the motor starts operation. To effect this, the stem 661 of the add key is provided with a shelf 669 which engages one end 670 of lever 671. The lever 671 is secured to a shaft 672 and is biased rearwardly by a strong spring 673. Upon depression of the add key, shelf 669 releases the lever 671 so that lateral extension 671A on the lever 671 engages V-shaped notch 675 in lever 383. Lever 383, as previously explained in conection with Figure 22, when rocked rearwardly, moves the bar 376 which in turn connects the motor and causes engagement of the setting clutch. When the add bar is depressed, the end 670 of the lever 671 finally locates on top of the shelf or extension 669 on the add key stem. This retains the add bar in depressed position until the main clutch has started operation. During the time that the add key is held depressed, the direction of rotation of the shafts 150 and 151 under control of the reverse unit 411 is determined by the mechanism shown in Figure 25 and as previously described.

Restoration of the add key, including removal of the end 670 of the lever 671 from over the shelf 669, and retensioning of spring 673, is secured through the pulsating mechanism previously described in conection with Figure 38. This mechanism, including cam 639, rocks member 635 on shaft 624. A link 674 is extended between member 635 and an arm 676 secured to shaft 672 to which lever 671 is also secured. A pin and slot connection 677 is provided between the link 674 and arm 676 so that rocking of the link 674 only effects and moves arm 676 when the add key is depressed and member 671 is rearward.

When the add key is depressed and lever 671 is in its rearward position, movement of the cam 639 rocks link 674 and causes lever 671 to be moved forwardly, lateral projection 678 on lever 671 sliding along latch lever 679 to engage notch 680 in lever 679. Latch lever 679 is hinged upon the side of the supporting plate and is biased by spring 681 to retain the lever 671 latched until the add key is raised and lever 679 is rocked upwardly by shelf 669 on the add key stem.

The add key must always be allowed to return to its initial upward position before another operation can be undertaken since the latch lever 679 retains lever 671 in latched position until lever 679 has been released from engagement with lever 671 by shelf 669 rocking the lever 679 upwardly and releasing lateral projection 678 of lever 671 from notch 680.

As has been previously mentioned, depression of the add key initiates only one machine operation after which the keyboard is cleared and the motor and main clutch come to rest. To prevent more than one main clutch operation, arm 562 is prevented from engaging lateral extension 485 and the main clutch dog 472 is not latched in open position. This is secured by bar 666 dropping down, by virtue of the slot 665 and pin 664, upon depression of the add key, to engage ear 682 on lever 560 and prevent shaft 563 and arm 562 thereon from rocking clockwise, as viewed in Figure 40. With lever 560 thus engaged, arm 562 cannot rock rearwardly and latch the main clutch dog 472 open. Therefore the main clutch dog engages the clutch upon completing a half revolution and brings it to rest.

The means employed for clearing the keyboard after each machine operation comprises downwardly extending arm (Figure 40) 650 which is secured to the shaft 638 and is rocked by cam 639. This arm includes ear 650A which, upon rocking of the lever, engages nose 687 at the rearward end of bar 666. Depression of the add key results in the downward movement of the nose 687 on the bar 666, the nose being positioned in the path of forward travel of this foot. Immediately upon rotation of cam 639, the arm 650 is rocked and ear 650A pushes bar 666 forwardly. This forward movement is sufficient to rock the clear gate 111 (Figures 2 and 40). Rocking of the clear gate, as previously described in connection with the manually set selection mechanism, results in the moving of all the slides 104 to the rear of the machine and releasing all latched keys.

Division mechanism and controls

The machine of the present invention includes mechanism for effecting division by the so-called "subtraction method." This method includes setting the dividend up in the accumulator after which the divisor is set up in the proper columns of the keyboard. Upon operation of the machine, the carriage is dipped and negative driving thereof effected until an overdraft occurs in the accumulator register. Thereupon, a restoration stroke is made by driving the accumulator in an additive direction.

Depression of the devision key 700 (Figure 41) initiates motor operation by closing of contacts 337 (Figures 15 and 22) and engagement of setting clutch 367. The setting clutch initiates releasing of the locking gate 197, sensing of the cams 146 and setting of selection plates 155, relocking of the set selection plates by the locking gate which remains locked until another operation of the setting clutch. Also, during operation of the setting clutch, mechanism is set permitting each of the previously described levers 244, carrying rollers 247 to follow the contour of their associated dial snail cams 224 (Figure 12) while the presently described counter reverse control (Figure 48) is set to the proper position. The setting clutch also causes engagement of the main clutch which, in turn, effects a negative driving, through proper setting of the reverse unit 411, of the quarter and half speed shafts at a much higher speed than is employed during other operations of the machine and intermittently instead of continuously.

The division key is latched in depressed position and the main clutch continues to rotate the quarter and half speed shafts, intermittently subtracting the value in the keyboard from that in the accumulator, until the value in the accumulator, in the operated orders, is reduced to zero and an overdraft occurs. During this time, the setting clutch is not operating, since it performs but one cycle of operation and that immediately following depression of the division key.

During the negative operation and up to an overdraft, foot 764 of the lever 244, to the left of the last operated order, is sensed. When the carry-over occurs, sensing of the roller carrier lever 244 to the left of the last operated order is utilized to stop the division drive and initiate one cycle of driving in additive direction during which all the division control parts are restored by the main clutch so that, immediately upon shifting of the carriage to the next order and depression of the division key, further subtractive operations occur.

During the restoration stroke, the division key remains latched in depressed position until the main clutch has made a portion of its restoration or corrective stroke, after which the previously described pulsating cam 639 releases the latched division key.

Mechanism is also provided for manually releasing the division key and permitting the division to be interrupted.

The mechanism for effecting these various operations will now be taken up in detail.

Setting clutch control

The division key 700 (Figure 41) is mounted on one side of the left supporting plate 621, upon a slidable stem 701, maintained and biased in an upward position by studs 702 and spring 703. The stem includes a projection 704 which extends through an opening in the control plate to retain two operating control levers 705 and 706 (Figures 44 and 45) in their neutral locations. These levers are supported on shaft 707 (Figure 41), lever 705 being secured to said shaft.

The general construction and function of the control levers 705 and 706 is generally similar to that of the operating levers 623 and 622 (Figure 38), as fully described in connection with the operation of the minus bar. Thus lever 705, upon release from engagement with the projection 704 on the division key stem 701, rocks rearwardly and results in operation of bar 376. As has been previously disclosed, operation of bar 376 (Figures 22 and 28) results in closing of the motor control circuit and engagement of the setting clutch. Lever 706 imparts the necessary rotational movement to lever 705 in clockwise direction toward the rear of the machine so that lever 705 is enabled to initiate setting clutch operation as well as to retain key stem 701 latched down.

To secure these operations, lever 705 is provided with an enlarged nose 710 (Figure 44) carrying a roller 711 which overlies operating bar 376 (Figure 41) so that rearward movement of lever 705 causes rocking of the bar 376 to start the motor and engage the setting clutch, as has been previously described. A spring 712 tends to keep projection 717 on lever 706 in engagement with nose 713 on lever 705.

Lever 705 carries a lug 714 thereon which is engaged by nose 715 on latch 708. Latch 708 is hinged on the side of the supporting plate and extends rearwardly as does another latch lever 709. The latch lever 709 includes a notch 716 which engages projection 717 on lever 706 during a short period of the division cycle, as will be presently explained. The latch levers 708 and 709 are both biased in a clockwise direction by springs 718 and 719, the rearward tip of lever 709 being maintained in contact with projection 704 on the division key stem 701 while the end portion of latch 708 is maintained in a position where it can engage projection 720 on arm 721 carried by shaft 638 which, as previously explained, is rocked by cam 639 to actuate the pulsating mechanism.

Lever 706 is U-shaped (Figure 45), including an arm 722 connected by link 723 to downwardly extending arm 724 of a division drive control lever 725 mounted on shaft 422 (Figure 32) and held thereon by screw and washer 727. The lever 725 is biased in a counter-clockwise direction by a strong, heavy spring 726 positioned between the arm 724 and the frame of the machine. The bias of this spring urges arm 724 in a counter-clockwise direction and levers 705 and 706 in a clockwise direction. Ordinarily these levers are restrained against movement, but upon shelf 704 passing beneath nose 710 on lever 705, the spring is free to pull lever 725 and levers 705 and 706. This causes roller 711 on lever 705 to bear down upon and actuate bar 376 to initiate operation of the motor and engagement of the setting clutch.

Conditioning of division drive

Rocking movement of the lever 725 by (Figures 41, 46 and 47) the spring 726 is employed for conditioning the division drive to rotate the actuating mechanism in a negative direction, intermittently and at an accelerated speed during part of each cycle, as well as to effect those operations previously explained. Lever 725 is equipped with an upwardly curved arm 725A extending therefrom radially to engage a complementary notch in box cam 728 (Figure 41) to restrain said cam against rotational movement. Another arm 729 is provided upon the lever outside of the path of rotation of three pins 730 carried on planet gear plate 572 (Figures 32 and 41). These pins are secured to the planet plate and carry planet gears 571. When lever 725 is rocked on shaft 422 on which it is retained by screw 727, in a counter-clockwise direction (as viewed in Figure 41) cam 728 is disengaged by arm 725A while arm 729 engages under one of the three pins 730 and restrains planet plate 572 against rotation. With lever 725 in the position shown in Figure 41, arm 725A engages the peripheral notch in cam 728 and the division drive is locked against rotation, sun gears 578 and 579 (Figure 32) being held stationary, as was explained in connection with the main reverse unit and Figures 35, 36, and 37. The planet gears 571 and 575 then revolve about the sun gears 578 and 579 when the unidirectional main clutch is driven, as has been previously explained, under the control of the minus bar. In division, however, the planet plates are held and the sun gears are free to rotate, arm 729 engaging a pin 730 on planet gear plate 572.

The box cam 728, as appears in Figure 32, is fastened to sun gear 578 and the box cam 728 intermittently drives gear 732 by engaging successively each one of five pins 731 riveted to gear 732. Gear 732 in turn drives gear 733 which is secured to a larger gear 734 meshed with a pinion 735 (Figure 33) keyed to sun gear 579. The sun gear 579, as previously explained, meshes with planet gears 575 which are within internal gear 576 which is rigidly secured to disc 577 of the reverse unit 411.

In division, with the planet plates 572 and 574 which are connected by sleeve 573 held stationary, when lever 725 is rocked in a counter-clockwise direction as viewed in Figure 41, the drive from the internal gear 570 to internal gear 576 is through the planet gears 571 onto the box cam 728 which is fixed to sun gear 578. The box cam 728 intermittently drives gear 732 and gear train 733, 734 and 735, planet gears 575 and, from these, internal gear 576 and disc 577 secured thereto and forming a part of the reverse unit 411.

Because of the sizes of the gears in this train, the reverse unit 411 is driven at a rate sufficient to secure the same movement in about half the cyclic time, the drive, due to the conformation of box cam 728, being an intermittent one to provide a dwell during each cycle of operation of the actuating mechanism during which a carryover wave can pass across the carriage.

Setting of roll carrier levers

During division the rollers 247 on levers 244 (Figure 12) are permitted to follow the contour of their associated snail cams 224 when the carriage is dipped for a subtractive operation. In the order to the left of the last operating order, an overdraft is sensed and is transmitted to division sensing mechanism to stop the machine and initiate a single cycle of additive actuation called the "corrective cycle" or "restoration cycle." It is only necessary that the first lever 244 to the left of the last operating order be sensed, but all the rollers 247 are permitted to follow the contours of their associated snail cams 224 so that the carrier wave can be transmitted across as heretofore described.

In Figure 41, elements of the carriage are shown in that position which they occupy when at rest and before being dipped. During dipping, shafts 250 and 245 are moved down with respect to shaft 746A.

Immediately upon depression of the division key, spring 726 pulls lever 725 counter-clockwise and this is utilized, as hereinafter described, to release bell crank 746 to the position shown in dotted lines in Figure 41, so that restraint on levers 244 is removed. This permits the roller on each lever to engage and follow its snail cam when the carriage is dipped during the subtractive operation.

During a division operation, snail cams 224 rotate clockwise and when an over-carry operation takes place, lever 244 of the sensed order moves from the highest to the lowest point on its cam. The drive is thereupon conditioned, as before mentioned, for one cycle of positive operation, bell crank 746 being returned to its original position, moving in a clockwise direction, and levers 244 being moved so that the rollers 247 clear the high points on the snail cams 224 as in all other calculations, so that the latter can rotate freely in the additive or counter-clockwise direction for one cycle, after which the machine is stopped, as will be presently described in detail.

Removal of restraint on bell crank 746 is accomplished by rotating about shaft 747 restraining lever 745, said lever having its lower end in contact with a roller 748 on rock plate 749. Stud 750 supports the rock plate 749 for rocking movement and the rock plate is connected to one arm of a bell crank 751. The bell crank is hinged at 752A to an arm 752 fixed to shaft 761 and is connected with arm 753 on lever 725 by pin 754 in slot 754A. Movement of lever 725 by spring 726 is transmitted to rock plate 749 to move lever 745 to the dotted line position shown in Figure 41 and release bell crank 746, by raising pin 754 which causes simultaneous counter-clockwise movement of levers 752 and 749. This movement of lever 752 rocks shaft 761 to condition the overdraft sensing mechanism as hereinafter described.

Setting of sensing mechanism in carryover operation

As previously explained, a carryover in the first roller carrier to the left of the last operating order is sensed and the mechanism used therefore is employed to initiate a cycle of additive actuation, called the "corrective" or "restoration" cycle, after which the machine is stopped. This is accomplished as follows:

The sensing mechanism for the rollers 247 includes levers 756 and 757 adjacent to foot 764 on lever 244 in the order to the left of the last operation order. Mounted for rotation upon shaft 758, lever 757 is connected by link 759 to arm 760 secured to shaft 761 so that whenever the shaft 761 is rotated, lever 757 is rocked. When this rocking movement takes place in a counter-clockwise direction, lever 757 moves lever 756 to swing the projection 763 into contact with that foot 764 on the roll carrier lever 244 positioned immediately over projection 763 in the division operation. This is the first roll carrier to the left of the last operating order in the division problem.

Lever 756 is hinged on lever 757 at 765 and is urged into engagement with lever 757 by spring 766 positioned between lever 757 and arm 767 on lever 756. This connection permits projection 763 to follow the movement of foot 764 on the roll carrier lever 244 very closely during operation. With foot 764 in that position corresponding to a zero registration on the dial, lever 756 will describe the maximum clockwise rotation with respect to lever 757 when the latter is rocked in counter-clockwise direction upon rotation of shaft 761. Relative movement between the two levers, tensions the spring 766 and forces projection 763 to engage foot 764 and to follow the foot during the division operation so that the true value position of the respective dials is constantly sensed. The moment an overdraft occurs, roller 247 drops off the highest point on the cam 224 to the lowest point on said cam, and causes a sudden movement in the roll carrier 244. This causes an equally sudden movement in lever 756 with the result that said lever snaps forward in a counter-clockwise direction until its lug 768 contacts lever 757, this movement being caused by tension spring 766. This movement of lever 756 is employed to stop the division drive and initiate the single cycle of additive rotation termed the "corrective" or "restoration" cycle. The mechanism for securing this operation will now be described.

The mechanism operated as a result of the sensing of an overdraft includes arms 770 and 771 secured to shaft 772. Spring 773 pulls arm 771 clockwise, the movement being limited by pin 774 engaged by arm 770 (Figures 41, 46 and 47). Yieldable member 775 is hinged at the extremity of arm 770 and includes an extending shelf 776. A tension spring 777 is positioned between the arm and member 775 to provide a yielding connection in a counter-clockwise direction.

Arm 771 carries a latching hook 778 (Figures 46 and 47) which engages an extension 779 on pivoted dog 780 when said dog is raised by the movement of lever 725. This dog includes a lateral projection 781 which can engage one of the two lugs 782 extending from plate 783 rigid with the driven side of the main clutch. The dog includes an arm 784 extending forwardly, adjacent the pin 754 supporting the dog, the arm 784 being connected to a double acting compression-expansion link 786 extending between the end of the dog arm 784 and pin 787 on lever 725.

At the beginning of the division operation, lever 725 is rocked counter-clockwise upon depression of the division key. The compression-expansion link 786 pulls the dog 780 in a counter-clockwise direction at the same time that the pivotal support for the dog, pin 754 in arm 753 on plate 725, is rocked upwardly. This movement brings the dog into a position in which the projection 781 is free, and will clear the extending lugs 782, (Figure 46), the dog being latched in this position by engaging the nose 779 on arm 771. This movement of the dog serves to compress the link spring in the unit 786.

This unit (Figure 46A) includes a link 786A, secured by a stud to arm 784 and having a slotted end positioned by pin 787 on lever 725, and a link 786B, having a slotted end positioned by said stud and the other end secured by pin 787 to lever 725. Each link includes two opposite tenons between which a single spring 786C is positioned. When link 786A is slid over link 786B, the spring 786C is compressed between two opposite tenons, one on each link while when link 786B is slid over link 786A, said spring 786C is also compressed but by the other two opposite tenons. This provides a linkage urged by a single spring to be of a constant length irrespective of which link is moved and which is held relatively fixed, the tenons on a link being of different lengths, serving to keep the spring between the two links on relative movement.

When an overdraft occurs in the machine, lever 756 is rocked forward until arm 767 engages the yieldable shelf 776 even though a yielding connection is provided between the member 775 carrying shelf 776 and arm 770. The yielding connection is provided to facilitate and improve control. Thus, in controlling off the first order to the left of the last operating order, it is necessary to avoid a tripoff in case the control order has a high digit, for instance, a nine, when the division is first started in that order, but to secure the tripoff, when the nine comes into such order following the registration in that order having been reduced to zero.

To secure this result the arm 767 on lever 756 is arranged so that it will be at such a radius from the center of pivot 758 when spring 766 is collapsed, that is lever 757 is rocked forward, the arm 767 will pass freely beneath and not engage shelf 776. However, as the registration upon the controlling dial is gradually decreased and lever 244 is rocked in a counter-clockwise direction, lever 756 will be rocked clockwise about pivot 765 which, by this time, has assumed a certain fixed position well forward of the position in which it is shown in Figure 41. The clockwise rotation about this new position of pivot 765 will cause arm 767 to rise up against shelf 776 rocking it in a counter-clockwise direction and, by the time registration on the dial has gotten down to zero, arm 767 will have rocked completely to the rear of and allowed shelf 776 to fall back into its normal position. When thereafter roller 247 drops off the high position of the cam to the low position thereof and allows lever 756 to rock in a counter-clockwise direction, spring 766 collapses and arm 767 is brought down upon shelf 776 but will have no tendency to rock lever 775 counter-clockwise because of the downward component of this movement. The lug to which spring 777 is attached abuts against lever 770 to prevent clockwise movement. It will therefore cause a counter-clockwise rotation of lever 770 with shaft 772. This rocks arm 771 and latch 778 is released from that position in which it retains dog 780. When the dog is released, the spring in unit 786 expands and rocks the dog 780 about the pivotal support 754 therefor, thus bringing the projection 781 into the path of one of the two lugs 782 on plate 783 of the main clutch. This brings the machine to a standstill and sets the counter reverse, as explained in connection with Figure 48, for driving the counter in a positive direction.

When the projection 781 is engaged by one of the lugs 782 on the clutch plate 783, the dog 780 is rocked in a clockwise direction, the linkage supporting pin 754 being so arranged that the path of movement of said pin is substantially in a circle about shaft 481. This results in lever 725 being rocked in a clockwise direction, spring 726 retensioned and lever 725A being caused to engage the box cam 728, release the planet plate, and stop the division drive, the drive mechanism thereafter making one positive cycle of operation, whereupon the main clutch dog 472 is released. In addition, all of the mechanisms that were conditioned during the setting clutch cycle by rocking of lever 725 and that are connected therewith are returned, lever 706 being latched by latch 709. Lever 705, however, is not returned to initial position but is held by latch 708 to maintain operating bar 376 down and, through said operating bar, keep the main clutch operating (Figure 22) for a period to permit the restoration or corrective stroke to start.

After the restoration stroke has started, the pulsating mechanism, as previously described (Figures 39 and 40) rocks shaft 638 and releases and rocks all the control levers. Arm 721 rocks upwardly to engage the end of latch lever 708 and release lever 705, thus permitting the division key 700 to return to its initial position.

As the spring 726 is retensioned by movement of plate 725, the movement of pin 754 with respect to the end of arm 784, connected to link 786, tends to cam the end 781 of arm 780 off of the lug 782. This camming off is completed after the member 706 has been latched forward by latch 709, so that spring 726 is latched under tension while plate 783 is permitted to proceed with the restoring cycle. The spring 726 is thus retensioned by power operated means and is ready for another operation while all of the operating parts have been returned to their respective positions. If the carriage is shifted one order and the division key depressed, the machine again operates to subtract the values in the orders until an overdraft occurs in the accumulator, the machine operation, including the subsequent restorative stroke, being as described.

*Counter control*

The character of count in the counting register is controlled by lever 940. When this lever is in its forward position, the counting register will give a direct or positive count of multipliers in case of multiplication, and of quotients in the case of division; while, when lever 940 is moved to its rearward position, the counter will give a complementary or negative count of multipliers in multiplication and a complementary count of quotients in division.

In order to obtain a direct count in multiplication operations, it is necessary that the counter dials be driven in the same direction that the accumulator dials are driven, while, to obtain a direct count of quotients in division operations, it is necessary that the counter dials be driven in the opposite direction to that in which the accumulator dials are driven. This requires a reversal of the counter drive upon the initiation of the division operation so that in whichever position lever 940 stands, the interchange from the proper direction of actuation of the counter for multiplication to the proper actuation for division, is automatically secured. In the present machine, this is accomplished without moving the lever 940 from its forward position.

As previously described, shaft 707 is rocked clockwise during division and rocked back counter-clockwise at all other times. Lever 850 is mounted upon this shaft 707. Lever 950, upon clockwise rocking of shaft 707, pushes link 945 to the rear, bringing the connection point 963 of link 944 to position B from position A so that the counter dials will be driven in the opposite direction to that in which the accumulator dials are being driven. With the lever 940 in the rearward position against pin 947 and point 963 in position B, a similar movement of link 945 would serve to bring connection point 963 to position C in which the counter dials would be driven in the same direction as the accumulator dials and would thus record the complement of the quotient rather than the direct quotient. Thus, upon division, that character of result is entered into the counter register which is called for by the lever 940, even though the drive in division is reversed.

Upon a carryover occurring in the accumulator, the restorative cycle is commenced during which shaft 707 is rocked counter-clockwise and lever 850 is rocked in a counter-clockwise direction. This results only in spring 964 being tensioned, lever 965 remaining in its set position until the main clutch has completed its cycle when the slots in gears 956 and 958 come into alignment and lever 965 is returned into engagement with lever 850 by spring 964. This flexible connection between lever 850 and lever 965 permits the other portions of the division mechanism to return to their normal positions during the first part of a corrective or restoration cycle with delayed setting of the counter reverse until the slots in gears 956 and 958 come into alignment at the end of the restoration cycle.

Interruption of operations

The division operation just described is conducted under the so-called subtraction method, whereby the dividend is first set up in the carriage dials, the divisor in the proper columns of the keyboard, the divisor being thereafter subtracted from the dividend in each order as often as may be necessary to reduce the dividend to some value less than the divisor. Now it may happen that the operator will not line up the highest digit of the dividend with the highest digit of the divisor before depressing the division key. If this is not done, and the machine is started, the machine may continue to subtract a very great number of times because the operation has been commenced in too low an order. Also, if the division key is depressed without a value in the keyboard, the machine will operate continuously. In these cases, the operator stops the machine.

In order to stop the machine quickly, another one of the automatic control keys has been provided in such a manner that the division operation can be interrupted immediately and the machine brought to rest. An arm 790 (Figure 30) is secured to shaft 772 carrying arm 771 which, as previously explained, can bring projection 781 on dog 780 into engagement with one of the lugs on the clutch plate 783 (Figures 40 and 47). This arm 790 (Figure 30) extends forwardly to be engaged by tip 791 on plus bar frame extension 649. Thus, immediately upon depression of the plus bar during the course of a division operation, shaft 772 is rocked in a counter-clockwise direction and the dog 780 is moved to bring its projection 781 into the path of one of the lugs 782. This causes a retensioning of spring 726 and brings the division operation to rest, the division key being restored and the mechanism being released for another selected machine operation.

Circuit control

The electric motor utilized in the machine is under the control of a switch 795 (Figure 1) manually operable at the keyboard of the machine to close the circuit and admit current to the machine under the control of contacts 337 (Figure 15). As previously described, the motor operates immediately upon depression of one of the operation control keys, the motor stopping when all clutches have finished their cycles. Operation of the contacts 337, by lateral movement of the insulating member 334 to permit said contacts to come together, has been previously discussed in connection with each operation control key.

Counter mechanism

A counter mechanism is provided in the upper portion of the carriage (Figures 11, 12, and 13) so that the number of operations performed in addition or subtraction operations may be recorded, the mechanism also serving as a multiplier register in multiplication operations and as a quotient register in division operations. This mechanism includes a plurality of dials 900 which are observed through sight openings 901 (Figures 1, 8, 11, 12, and 13) in the accumulator carriage. The construction of these dials is similar to that described in connection with Figure 14 under the accumulator mechanism to which reference may be had for a detailed description of the construction thereof.

In the present case, the dials are mounted upon shaft 902 extending through end plates 201 and brace plates 208. Each order of the counter unit includes a gear 903 rotatably mounted upon a shaft 904, also extending through said plates, gear 903 being engaged with a gear 905 and its cooperatively associated counter dial 900. Gear 905 corresponds to gear 228 in Figure 14. As the carriage is shifted across the machine, the gear 903 in each order is selectively presented to an actuating finger 906 (Figures 48 and 49). This finger is mounted on an eccentric 910 on shaft 907 and is supported intermediately by pin and slot 909 so that the finger is moved to engage and rotate the particular gear 903 presented. The gear 903 is selectively rotated by reversing the direction of rotation of the eccentric. In one case the finger is moved toward the gear, then up and back to drag the gear around. In the other, the finger is moved forward, to push the gear around in the opposite direction, and then down out of engagement, and back. The finger is retracted from the gear 903 after each single actuation so that the counter dial is moved one step at a time, each successive counter dial unit to the left of that unit actuated by finger 906 being moved one increment upon the preceding dial carrying over from nine to zero.

Immediately prior to each rotation of the counter dials, either clockwise or counter-clockwise, roll carriers 244C (Figure 12) are rocked to remove rollers 247C out of contact with and out of the path of snail cams 214C. This occurs only in the operated order and all orders to the left thereof, obviating the strain on the mechanism which would result if the rollers had to be backed up the steep rise in the came in additive operation.

The roll carrier in the operated order is rocked during each main clutch cycle by an arm 911 carried on shaft 913 and held against cam 908 by spring 1000 (Figures 11 and 48). Cam 908 rotates with eccentric 910 and during each main clutch cycle cam 908 rocks said arm 911 to rock member 914 opposite thereto on shaft 915 clockwise to rock roll carrier 244C about shaft 904 and remove its roller from the path of the associated snail cam.

The member 914 actuated is the one in the actuated order, arm 911 lying adjacent finger 906. Movement of member 914 is transmitted to all those to the left thereof so that all roll carriers to the left are rocked. To accomplish this, member 914 (Figure 10) includes a lateral portion 916 joining it to another member 917 likewise positioned on shaft 915 and integral with member 914. Member 917 includes a projection 918 engaging the next member 914 so that if lateral portion 916 is engaged by arm 911, the first member 914 rocks the second member 914 and all to the left thereof, while those to the right remain undisturbed because the interlock is only in one direction.

The counter clearing mechanism is locked during each stroke of finger 906 and actuation of the counter. Thus arm 911 is rocked in by cam 908 (Figure 11) with each movement of finger 906 by eccentric 910 to bring lateral extension 911A of arm 911 into engagement with lug 920A of member 920 keyed on shaft 915 opposite thereto. This is done to prevent possible movement of shaft 915 by members 914 through frictional action.

Selective rotation of shaft 907 is secured through a gear train which includes gear 931 on shaft 907 (Figure 49), gear 932 on shaft 913 in engagement with gear 934 secured to shaft 936. Shaft 936 is journaled between frame plate 937 and auxiliary plate 938.

Selective driving of the finger 906 is accomplished under the control of lever 940 which is positioned at the right hand side of the keyboard and is pivoted on the right side frame. The lever is centralized in either of two positions by a spring 941 and is connected by a link 942 and pin 972 to one end of a link 943. Link 943 is connected at its middle to a link 944 and at its other end by a pin 973 to a link 945 and to a link 970 pivoted at 971. Movement of lever 940 is limited by stop pins 946 and 947. Link 944 is connected to one end of a lever 948 mounted on a shaft 949, lever 948 providing a radial cam. This cam operates a slidable shaft 950 which is supported by sleeve 951. One end of shaft 950 is keyed into flat slide 952 by enlarged portion 953, the shaft 950 being used to move slide 952. Slide 952 includes a projection 954 thereon which can be selectively engaged with slot 955 provided in gear 956 and slot 957 in gear 958 mounted on shaft 936.

Gear 956 is driven directly by gear 585 from the main clutch (Figures 31, 48, and 49) while gear 958 is driven through gear 538 and double faced idler 959. Whenever the main clutch is rotated, therefore. gears 956 and 958 will be rotated but in opposite directions so that when the projection 954 is engaged with the gear 958, it will be driven by that gear in one direction while, if it is in the slot 955 in gear 956, it will be driven in the other direction, so that gear 934, keyed to shaft 936, can be driven in opposite directions.

The gear train, including gears 931 and 932, can thus be reversed in its direction of rotation to rotate shaft 907 in either a clockwise or a counter-clockwise direction. The ratio between the gears is such that the finger 906 will describe a complete circle for each half revolution made by the main clutch. This arrangement results in the counter dial being advanced one full increment, against the restraint of pawl 249C, for each main clutch cycle, although this main clutch cycle is completed in only a half revolution.

The relation of the gearing is such that, upon additive rotation of the quarter and half speed shafts, with projection 954 in the slot in gear 958, the counter actuating finger moves the counter dial in the same direction as the accumulator dials while, with the projection 954 in the slot in gear 956, similar actuation results in the dials being moved in the subtractive direction and complementary figures being entered in the dials. The direction of rotation of the counter dials is under the control of the radial cam on lever 948. This cam includes two extending ends 961 which engage shaft 950 to set it for rotation of the counter dials in the same direction as the accumulator dials, and a central depressed portion 962 wherein the dials are moved in the opposite direction to the accumulator dials. In division, the counter drive is reversed with respect to the accumulator dials and lever 948 is therefore mainipulated so that the value called for by the original setting of lever 940 is placed in the counter, as will be hereinafter described.

*Clearance of the counter*

As has been described under Automatic clearance, automatic means are provided for clearing the accumulator mechanism. In addition to the means previously described, a counter clear key 966 is provided adjacent to the accumulator clear key 302 (Figures 1 and 15) for selectively clearing the counter. This clear key 966 sets into operation mechanism similar to that described in connection with Automatic clearance and shown in Figure 15, to close contacts 337 and start the motor into operation. A clear clutch 521 released by a clutch dog 978 controlled by a lever 979 and biased by spring 980, serves to rock a cam 981 and rock a lever 982 similar to lever 316. Lever 982 is attached to one end of a forwardly rocking lever 983 supported at its forward end by a radial slot and pin connection 984 (Figure 11). Rocking of lever 982 rocks lever 983 forwardly to engage projection 986 on associated member 920 positioned before the lever 983. Member 920 is keyed to shaft 915 and includes a projection 989 in a slot 990 of rocking lever 991 which is supported on shaft 904. Rocking of lever 991 brings projection 992 into the path of zero stop projection 221C (Figure 11) on each dial assembly, as well as to engage one of the four projections 236C of each dial unit. Rocking of lever 920 also results in ear 993 thereon engaging projection 249E on pawl 249C to lift the pawl free from ratchet wheel 215C. Further movement of lever 920 brings projection 986 into engagement with portion 918 of member 914. This member, as previously described, rocks roll carrier levers 247C and returns the dial until projection 992 is engaging projection 221C on the dial. The dial is then in zero position where it remains.

The counter is cleared in all orders even though the order engaged by lever 983 is an intermediate one. All levers 920 are keyed on shaft 915 so that rocking of one order is transmitted to all other orders on the right and on the left thereof. When levers 244C are rocked, the rollers are removed from the snail cams and the dials returned to zero where they are stopped.

Frame

An advantageous frame construction is disclosed in Figures 2, 51, and 52. This construction enables two frame members to be connected to secure a rigid, stable frame, even though the frame members are relatively light plates. Such a construction is particularly advantageous in a machine of the present description, inasmuch as it enables a heavy base, such as a casting, to be avoided. Thus in the present machine the frame members, and certain braces therefor, have been advantageously constructed of plate members 1100 and 1101. These members, meeting at right angles, are of relatively light plate, but they are secured together in such a manner that they are preserved in accurate alignment and are so rigid that the frame is entirely satisfactory. To construct this frame, plate 1101 is provided with two spaced apertures 1102, the width of these apertures being accurately observed so that tongues 1103 on plate 1100 can pass and yet abut the sides of the plate forming the apertures 1102. The plate 1100 is recessed as at 1104 adjacent to the tongues 1103 to provide extending fingers 1105. The surface of these fingers in abutment with plate 1101 is accurately machined and the distance between the ends of the fingers in engagement with plate 1101 and the fingers at the other end of plate 1100 correspond to the distance between plate 1101 and the other member to which it is connected by plate 1100. Each finger 1103 includes a projection 1106 extending into recess 1107 separating said fingers so that a nut 1108 can be inserted therein. This nut is engaged with a screw 1109 which extends through plate 1101. The surface of projection 1106 against which plates 1108 abut is slightly above the several fingers 1105 so that when the screw 1109 is tightened up with nut 1108, a slight tension is effected between the plates 1101 and 1102, thus preserving the plates in abutment with each other and securely fastened together.

I claim:

1. In a motor driven calculating machine, cyclically operable actuating mechanism, a first control member therefor adapted to be held in operated position by the operator to cause continuous operation of said mechanism, a second control member adapted to be operated either alone or concurrently with said first member to effect a single cycle of operation of said mechanism, and means controlled by said second member for superseding the control of said mechanism by said first member to arrest said mechanism after a single cycle of operation.

2. In a calculating machine, the combination of registering dials, actuating mechanism therefor, selecting mechanism for setting selected values into the actuating mechanism, a clutch controlling the actuating mechanism, a manipulable member operable to engage the clutch and restore the selecting mechanism to zero selection, and another manipulable member operable to engage the clutch without changing the values set in the selecting mechanism.

3. In a calculating machine, a cyclically operable counter actuator, counting mechanism displaceably mounted with respect thereto whereby any order of said counter may be actuated thereby, carry mechanism for said counter comprising an entrained differential gearing between orders thereof in association with a compensating cam and cam follower, and means for suspending cooperative relationship between the cams and cam follower of orders superior to that being actuated, the cooperative relationship being undisturbed in the remaining orders.

4. In a motor driven calculating machine having an actuator, an accumulator, means for moving said accumulator into engagement with said actuator, and means for controlling the connection of said actuator to the motor; the combination of means for latching said accumulator in engagement with said actuator, and means controlled jointly by an element of the accumulator moving means and an element of the means for controlling operation of the actuator, for releasing said latching means.

5. In a motor driven calculating machine having an actuator, an accumulator, means for moving said accumulator into engagement with said actuator, and means for controlling the connection of said actuator to the motor; the combination of means for latching said accumulator in engagement with said actuator, and means driven by the motor and controlled jointly by an element of the accumulator moving means and an element of the means for controlling operation of the actuator, for releasing said latching means.

6. In a motor driven calculating machine, a cyclic main clutch, a cyclic setting clutch, means operated by said setting clutch for initiating operation of said main clutch, a latch for thereafter maintaining said main clutch in operation, a spring pressed member for initiating operation of said setting clutch, latching means for said member, and a key effective upon depression to release said latching means and upon retraction to release said latch.

7. In an actuating mechanism for calculating machines, a plurality of members operable at different speeds, register drive gears, and elements settable to connect each of said gears to one of said members to effect a plurality of numerical selections and to connect each of said gears to another of said members to effect a plurality of numerical selections.

8. In a calculating machine, the combination of registering mechanism, cyclically operable, settable actuating mechanism therefor comprising means for driving said registering mechanism continuously throughout one or more cycles of operation of said actuating mechanism; and selecting mechanism for setting said actuating mechanism comprising manually settable value selecting devices, a plurality of members each movable to a plurality of positions corresponding to numerical values and means comprising complementarily movable members, the relative excursion of which is controlled by said value selecting devices, for positively moving said members to selected position.

9. In a calculating machine, the combination of registering mechanism, cyclically operable, settable actuating mechanism therefor comprising means for driving said registering mechanism continuously throughout one or more cycles of operation of said actuating mechanism; and selecting mechanism for setting said actuating mechanism comprising an element differentially settable to a series of positions representing numerical values, a plurality of members each movable to a plurality of positions corresponding to numerical values and means comprising complementarily movable members, the relative excursion of which is controlled by said element, for positively moving said members to selected position.

10. In a calculating machine, the combination of registering mechanism comprising a plurality of rotatable registering wheels arranged in denominational orders and a plurality of differential gearing assemblies continuously operable to transmit to each of a plurality of said wheels, rotational movement proportional to the sum of separate rotational movements entered into each of said assemblies respectively; selectively settable, cyclically operable, rotary actuating mechanism arranged in denominational orders and operable to enter selected amounts into said differential gearing assemblies respectively, comprising means for simultaneously driving each of a plurality of said assemblies continuously throughout one or more cycles of operation of said actuating mechanism at individually selected speeds; and tens-carrying mechanism operable to enter carried amounts into said differential gearing assemblies comprising means respectively operable by each of a plurality of said registering wheels for driving one of said assemblies continuously throughout one or more cycles of operation of said actuating mechanism at a speed proportional to the speed of operation of the registering wheel operating the same.

11. In a calculating machine, the combination of registering mechanism comprising a plurality of rotatable registering wheels arranged in denominational orders and a plurality of differential gearing assemblies continuously operable to transmit to each of a plurality of said wheels, rotational movement proportional to the sum of separate rotational movements entered into each of said assemblies respectively; selectively settable, cyclically operable, reversibly operable rotary actuating mechanism arranged in denominational orders and operable to enter selected amounts into said differential gearing assemblies respectively comprising reversibly operable means for simultaneously driving each of a plurality of said assemblies continuously throughout one or more cycles of operation of said actuating mechanism at individually selected speeds; and reversibly operable tens-carrying mechanism operable to enter carried amounts into said differential gearing assemblies comprising reversibly operable means respectively operable by each of a plurality of said registering wheels for driving one of said assemblies continuously throughout one or more cycles of operation of said actuating mechanism at a speed proportional to the speed of operation of the registering wheel operating the same.

HAROLD T. AVERY.